US007161688B1

(12) United States Patent
Bonner et al.

(10) Patent No.: US 7,161,688 B1
(45) Date of Patent: Jan. 9, 2007

(54) MASS SCANNING AND DIMENSIONING SYSTEM

(76) Inventors: Brett Bonner, 1851 Oak Run Cove, Germantown, TN (US) 38138; Ole-Petter Skaaksrud, P.O. Box 38025, Germantown, TN (US) 38183; Cameron Dryden, 148 Stratford St., W. Roxbury, MA (US) 02132; Andy Jankevics, 80 Carlisle Rd., Westford, MA (US) 01886; Steve Tubbs, 109 Clay St., Cambridge, MA (US) 02140; Mark Chirstiansen, 177 Belmont St., Belmont, MA (US) 02478

( * ) Notice: Subject to any disclaimer, the term of this patent is extended or adjusted under 35 U.S.C. 154(b) by 80 days.

(21) Appl. No.: 09/649,609

(22) Filed: Aug. 29, 2000

Related U.S. Application Data

(60) Provisional application No. 60/151,620, filed on Aug. 31, 1999.

(51) Int. Cl.
*G01B 11/04* (2006.01)
(52) U.S. Cl. .................. 356/627; 356/634; 356/625
(58) Field of Classification Search ............... 356/627, 356/628, 634, 635; 250/559.21, 559.24; 702/156; 235/462.01, 462.2, 472.01
See application file for complete search history.

(56) References Cited

U.S. PATENT DOCUMENTS

| 4,992,649 | A | 2/1991 | Mampe et al. |
|---|---|---|---|
| 5,237,163 | A | 8/1993 | Collins, Jr. et al. |
| 5,253,302 | A | 10/1993 | Massen |
| 5,291,564 | A | 3/1994 | Shah et al. |
| 5,373,561 | A | 12/1994 | Haber et al. |
| 5,402,364 | A | 3/1995 | Kitoh et al. |
| 5,414,647 | A | 5/1995 | Ebenstein et al. |
| 5,448,078 | A * | 9/1995 | Nakazawa ............. 250/559.24 |
| 5,719,678 | A | 2/1998 | Reynolds et al. |
| 5,737,438 | A | 4/1998 | Zlotnick et al. |
| 5,757,286 | A | 5/1998 | Jonsson et al. |
| 5,769,640 | A | 6/1998 | Jacobus et al. |
| 5,770,841 | A | 6/1998 | Moed et al. |
| 5,815,274 | A | 9/1998 | Dlugos |
| 5,848,188 | A | 12/1998 | Shibata et al. |
| 5,923,017 | A * | 7/1999 | Bjorner et al. ............. 235/385 |
| 5,969,823 | A * | 10/1999 | Wurz et al. ................ 356/639 |
| 6,169,978 | B1 | 1/2001 | Lutz et al. |
| 6,189,702 | B1 | 2/2001 | Bonnet |

(Continued)

FOREIGN PATENT DOCUMENTS

DE 197 38 849 C1 11/1998

(Continued)

OTHER PUBLICATIONS

Lawrence J. Curran, "*Machine Vision and Barcode Inspection Idenify Fast-Moving Parcels*", Vision Systems Design, Sep. 1998, pp. 41-47.

(Continued)

*Primary Examiner*—Richard A. Rosenberger
(74) *Attorney, Agent, or Firm*—Finnegan, Henderson, Farabow, Garrett & Dunner, L.L.P.

(57) ABSTRACT

A package information capture system that provides dimensioning information about, and machine readable codes from, packages passing across a data capture point either singulated or non-singulated. The resulting data can be used to determine, for example, package dimensions, package coordinates, dimension confidence, package classification, and content and coordinates of the machine readable code. The dimensioning information is correlated with the machine readable code to form one record. Subsequent processes can access the record from all or part of the captured machine readable information to retrieve package dimension information.

27 Claims, 20 Drawing Sheets

U.S. PATENT DOCUMENTS

| | | |
|---|---|---|
| 6,311,892 B1 | 11/2001 | O'Callaghan et al. |
| 6,349,292 B1 | 2/2002 | Sutherland et al. |
| 6,360,947 B1 | 3/2002 | Knowles et al. |
| 6,517,004 B1 * | 2/2003 | Good et al. ............ 235/472.02 |
| 6,609,117 B1 | 8/2003 | Sutherland et al. |
| 6,889,194 B1 | 5/2005 | Kadaba |
| 6,976,007 B1 | 12/2005 | Boucher et al. |

FOREIGN PATENT DOCUMENTS

| | | |
|---|---|---|
| EP | 0 450 212 A1 | 10/1991 |
| EP | 0 582 964 A2 | 2/1994 |
| EP | 0 672 993 A2 | 9/1995 |
| EP | 0 833 270 A2 | 4/1998 |
| WO | WO 97/40342 | 10/1997 |
| WO | WO 99/49411 | 9/1999 |

OTHER PUBLICATIONS

News Release, dated Sep. 2, 1997 from Adaptive Optics Associates, Inc., titled "*Adaptive Optics Wins FedEx Package Dimensioning Systems Contact*".

Logistics Technology News, dated Sep. 12, 1997, vol. 2, No. 15, titled "*FedEx Rolls Out Dimensioning System Based on Machine Vision.*"

\* cited by examiner

Take pairs of straight line segments and replace them with one segment
If the area changes too much, reject the simplification 14a 14b 14c 14d

MASS SCANNING AND DIMENSIONING SYSTEM

CROSS REFERENCE TO RELATED APPLICATION

The present application claims priority to U.S. Provisional Patent Application Ser. No. 60/151,620, entitled Mass Scanning and Dimensioning System, filed on Aug. 31, 1999, which is incorporated herein by reference.

BACKGROUND OF THE INVENTION

The present invention relates generally to methods and apparatus for determining characteristics of objects, such as packages, in transit.

SUMMARY OF THE INVENTION

An object of the invention is to provide improved methods and apparatus for determining characteristics of objects, for example, packages, that are shipped from one location to another.

Additional objects and advantages of the invention will be set forth in part in the description which follows, and in part will be obvious from the description, or may be learned by practice of the invention. The objects and advantages of the invention will be realized and attained by means of the methods, elements and combinations particularly pointed out in the appended claims.

To achieve the objects and in accordance with the purpose of the invention, as embodied and broadly described herein, the invention comprises an apparatus for capturing information about objects moving relative to the system. The system includes an object dimensioning system for producing object dimension information for each object, an object identification system for producing object identification information for each object, and a processor programmed to provide functions including correlating the object dimension information for each object to the object identification for each object.

It is to be understood that both the foregoing general description and the following detailed description are exemplary and explanatory only and are not restrictive of the invention, as claimed.

The accompanying drawings, which are incorporated in and constitute a part of this specification serve to explain the principles of the invention.

DESCRIPTION OF THE PREFERRED EMBODIMENT

Reference will now be made in detail to the present embodiments of the invention, examples of which are illustrated in the accompanying drawings. Wherever possible, the same reference numbers are used throughout the drawings to refer to the same or like parts.

The term "belt" as used in this disclosure is intended to encompass all package transportation mechanisms including conveyors, slides, and gravity rollers. In the following description "along the belt" means measurements in the direction of belt motion (i.e., in the longitudinal or x-direction of the belt's length). "Across the belt" means measurements perpendicular to the direction of belt motion (i.e., in the transverse or y-direction of belt width) as shown in FIG. 1.

Figure 1:
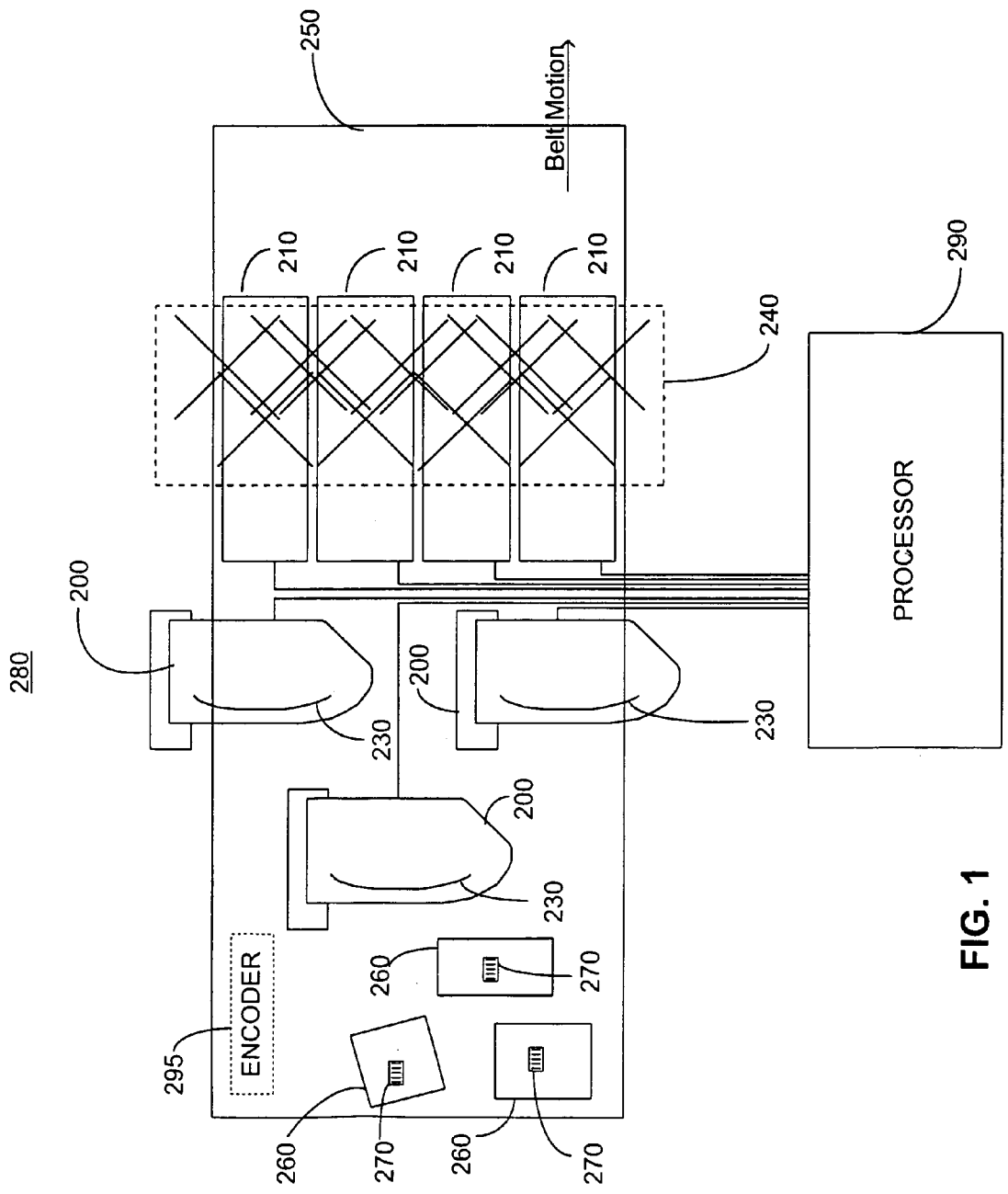
FIG. 1 is a plan view of a mass scanning and dimensioning system in accordance with the present invention.

FIG. 1 shows an exemplary mass scanning and dimensioning system (MSDS) 280 in accordance with the present invention.

The MSDS dimensions and reads machine-readable codes on singulated, i.e., separated, and non-singulated, i.e., adjacent, packages on a mass flow belt 250. The belt moving under the scanner may be defined by a coordinate system where Y is the direction of belt travel, X is the direction across the belt, and Z is the vertical (height) direction. Devices that are able to process only objects that are passed single file in the Y direction, i.e., where no more than one object may be located at the same time along the X axis as the objects pass the processing point, the processing apparatus is limited to processing "singulated" objects. If any part of more than one object may be present in the X direction at a given time during processing of the objects, then the system is defined as capable of processing "non-singulated" objects. The ability to dimension non-singulated objects gives greater flexibility to the operation of the MSDS system, as this obviates the need to ensure that parcels are physically separated as they pass through the system. MSDS 280 consists of dimensioning and machine code capture modules. Information captured comprises, for example, object dimensions, object coordinates, dimension confidence, package type, time of capture, and the content and coordinates of the machine-readable code. MSDS 280 combines the above information as required by application-specific needs, which can be predefined or operator selected.

MSDS includes vertical laser radar scanners 200 to determine the height contour of packages flowing past the scanners along belt 250. The height contour is subsequently used to distinguish and dimension individual packages 260, to determine a dimensioning confidence, and to focus multiple bar code scanners 210. The scan data from laser radar scanners 200 can be integrated to provide the height contour across the conveyor belt 250.

Images from the laser radar scanners 200 are processed to synchronize the scans, sub-sample scan data according to regular belt intervals, remove the effects of scan curvature, and to develop a single co-linear scan from multiple scans taken from different, overlapping positions. Package height contours are subsequently processed to determine the boundaries of each package 260, from which its length, width, height and overall package shape are determined.

Bar code scanners 210 are used across the conveyor belt 250 to read bar codes 270 located on packages 260. Bar code scanning of multiple bar codes 270 can be performed across the belt simultaneously, including multiple bar codes on a single package. Since scanners 210 can be focused separately, MSDS 280 can read narrower bar code line widths over a wider range of package heights than can conventional fixed-focus systems. The bar code data scanned by bar code scanners 210 is associated with the package dimensioning information by correlating positional data produced by the bar code scanners 210 and the laser radar scanners 200.

The laser radar scanners 200 and the bar code scanners 210 of MSDS 280 obtain data to determine, for example, package dimensions, dimension confidence, package count, package rate, belt speed, and distribution of package sizes and types. This data can be used for appropriately billing packages 260 according to their dimensions (dimensional weight), and to improve package processing operations within and between delivery facilities by optimizing conveyor belt utilization and personnel requirements, and by optimizing loading of containers, trucks and aircraft. The collected and determined data can also be used to control robotics for automated labeling, marking, and diverting of non-singulated packages.

Each laser radar scanner 200 is positioned ahead of the bar code scanners 210, because the height scan information obtained from the laser radar scanners 200 is preferably computed and used by the bar code scanners 210 for focusing the scanning beams 240. Laser beams emanating from laser radar scanners 200 result in curved scans 230 and the scanners are positioned so that the scans overlap across belt 250. In that way there is complete scan coverage across the belt by the laser scanners 200. Bar code scanners 210 are arranged across the belt 250 to project a total of, for example, 12 pairs of intersecting "X" patterns of scanning beams 240 on belt 250, thereby reading bar codes 270 across multiple "zones." In this way there is complete coverage of belt 250 by bar code scanners 210.

Figure 2:
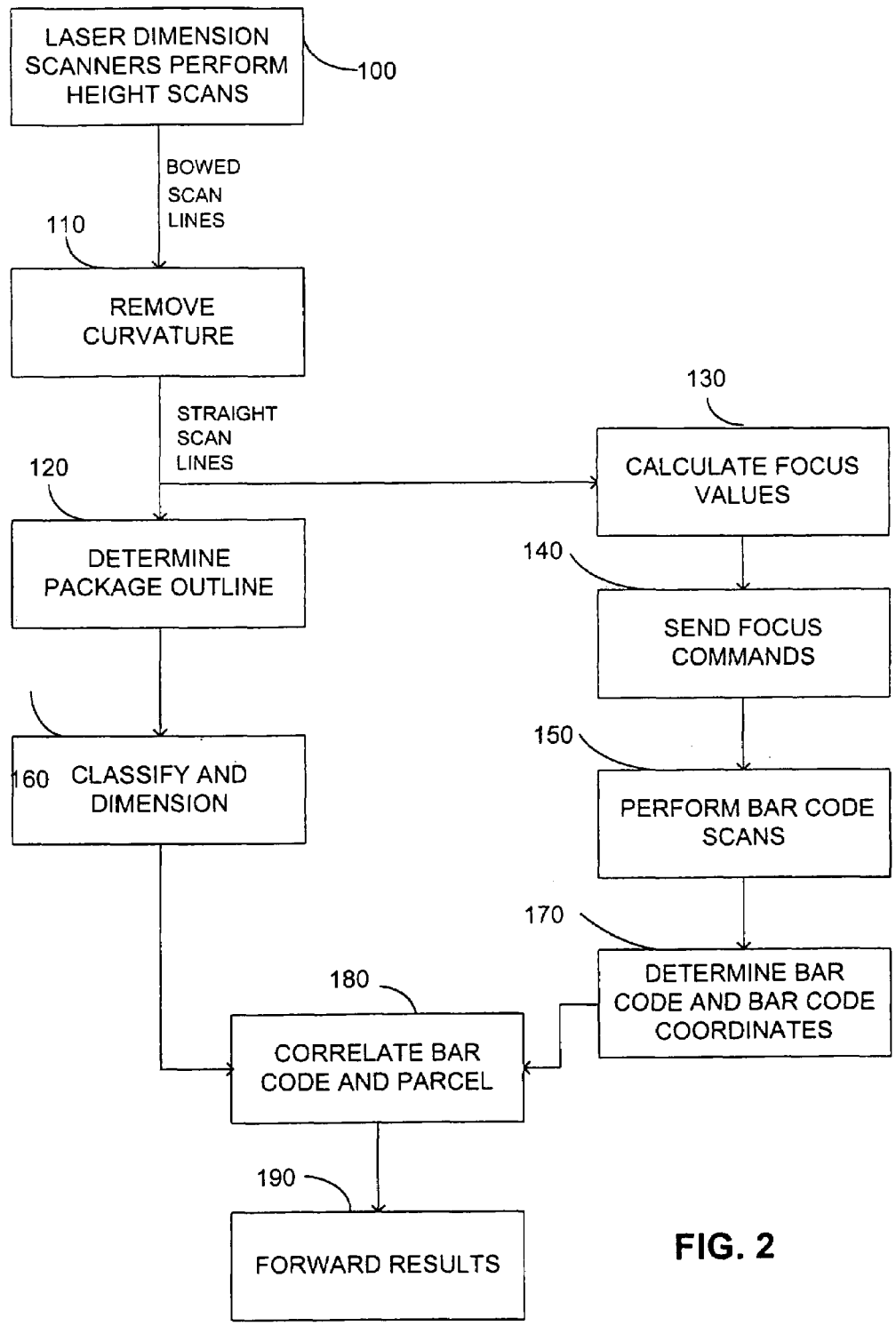
FIG. 2 is a flow chart of the operation of the mass scanning and dimensioning system of FIG. 1.

FIG. 2 is a flow chart of the operation of MSDS 280. For an exemplary five-foot-wide conveyor belt 250, MSDS 280 may, as an example, comprise three laser radar scanners 200, four bar code scanner modules 210 with three independently-focused bar code scanners each, an electronics/processing rack, and software for dimensioning and matching bar code labels to packages.

At step 100, laser radar scanner 200 perform height scans on packages passing beneath them. Bowed scan lines 230 are projected onto packages 260, resulting in energy being reflected from the surfaces of packages 260. The reflected beams are received by the laser dimensioner scanners 200, which produce data representative of the bowed scan lines.

At step 110, the bowed scan lines are processed to produce straight line scan data. The straight line scan data includes, for example, the height of the portion of the scanned package. The straight line scan data is used at step 120 to determine the outline of the scanned package and at step 130 to calculate focus values for bar code scanners 210. The focus values are sent to bar code scanners 210 at step 140, which perform bar code scans at step 150. The timing for the bar code scans is selected in accordance with the distance between laser radar scanner 200 and bar code scanners 210 along the belt 250 and the speed of belt 250.

The package outline data calculated at step 120 is used to classify and dimension the packages 260 at step 160. The classified and dimensioned package data is correlated with the bar code 270 associated with its package 260 at step 180. The correlation is performed in accordance with the bar code position data, in the form of bar code coordinates produced at step 170. Following the correlation of step 180, the data is forwarded at step 190 to applications for use and further processing of the data.

Figure 3:
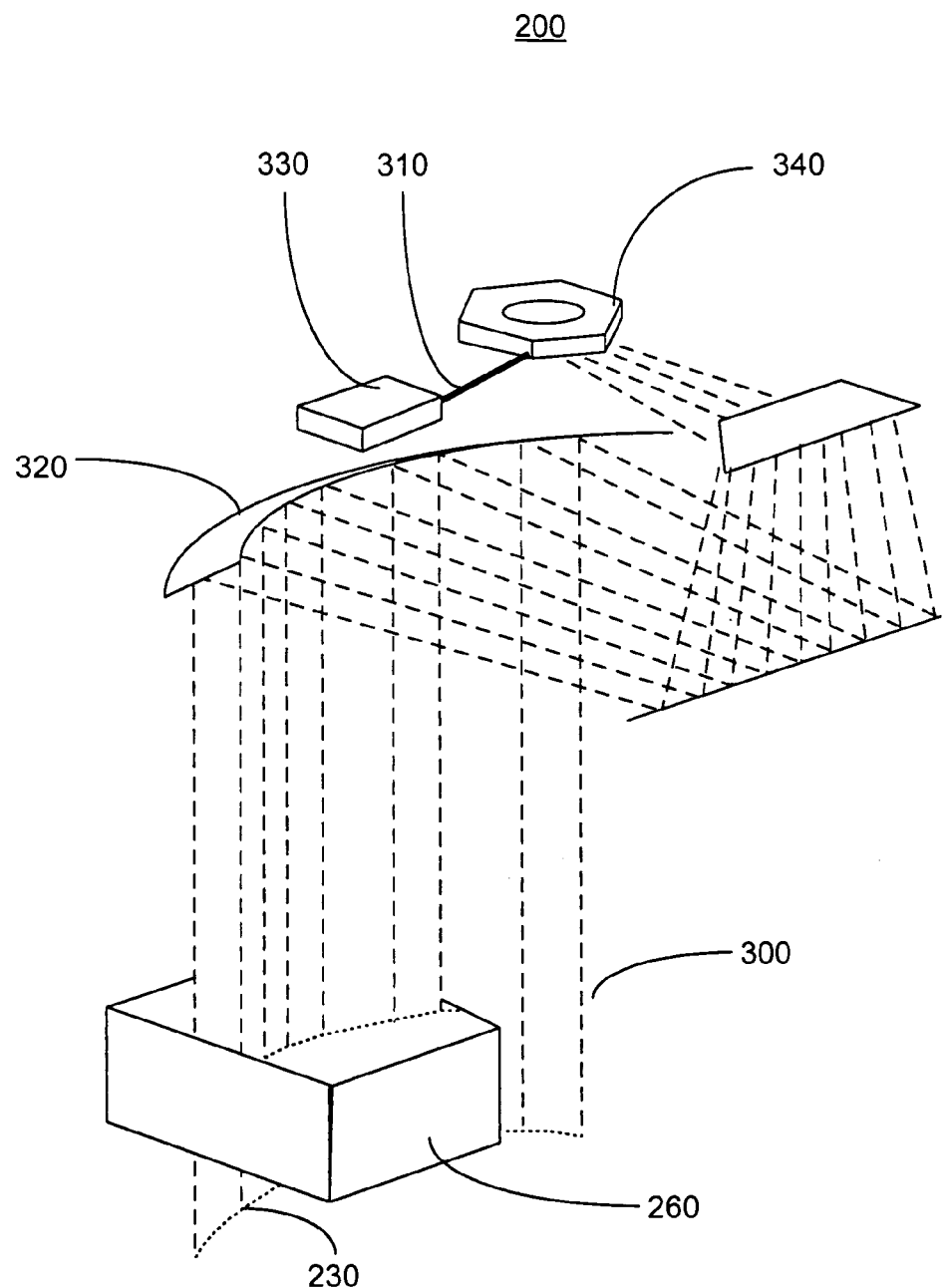
FIG. 3 illustrates operation of a laser radar scanner.

FIG. 3 illustrates a scan pattern 230 of laser radar scanner 200. Laser radar scanners 200 are constructed with a laser generator 330 producing a laser beam 310, spinning polygonal mirror 340, parabolic mirror 320 and a detector (not shown). The laser 330 is fixed in place producing a single beam of light 310, which scans as a result of being reflected by the spinning polygonal mirror 340. The laser light 310 is again reflected on curved mirror 320, which has a size and shape appropriate to shine the laser straight down onto the belt 250, with the beams for each spot on the belt falling parallel as if the laser were actually located at a very great distance away from belt 250. The final element is the detector which compares the outgoing and incoming light to determine the time of flight and thus the distance. Laser radar scanner 200 outputs a measurement of height and reflected light intensity for each point along a curved line 230 representing the locus of the reflected laser beam falling onto belt 250, which corresponds to the shape of the mirror 320.

For scanning non-singulated packages, use of vertical scan beams 300 is important to avoid the "shadowing" effect that can occur when a tall parcel hides a nearby shorter package when the scanning beam is at an angle from the vertical. The use of vertical scan beams 300 is also important for accurate package dimensioning over a range of package heights. When multiple laser radar scanners 200 are used to cover differently sized belts, each beam should be perpendicular to belt 250 in the x- and y-directions. The MSDS dimensioning scanner mounts (not shown) provide two-axis tilt adjustment to achieve precise laser alignment to achieve such perpendicularity.

As conveyor belt 250 advances, the MSDS processor 290 constructs a contour map of package height profiles using the data from laser radar scanners 200, and uses image processing algorithms to identify and measure the individual packages. Because parabolic mirror 320 is curved, the package images appear distorted. This distortion differs at different positions across parabolic mirror 320. Consequently, a given package 260 appears differently depending on which portion of mirror 320 it passes beneath. This curvature is removed through geometric image processing so that subsequent shape and size determination algorithms are independent of the position of a package 260 on belt 250.

Figure 4:
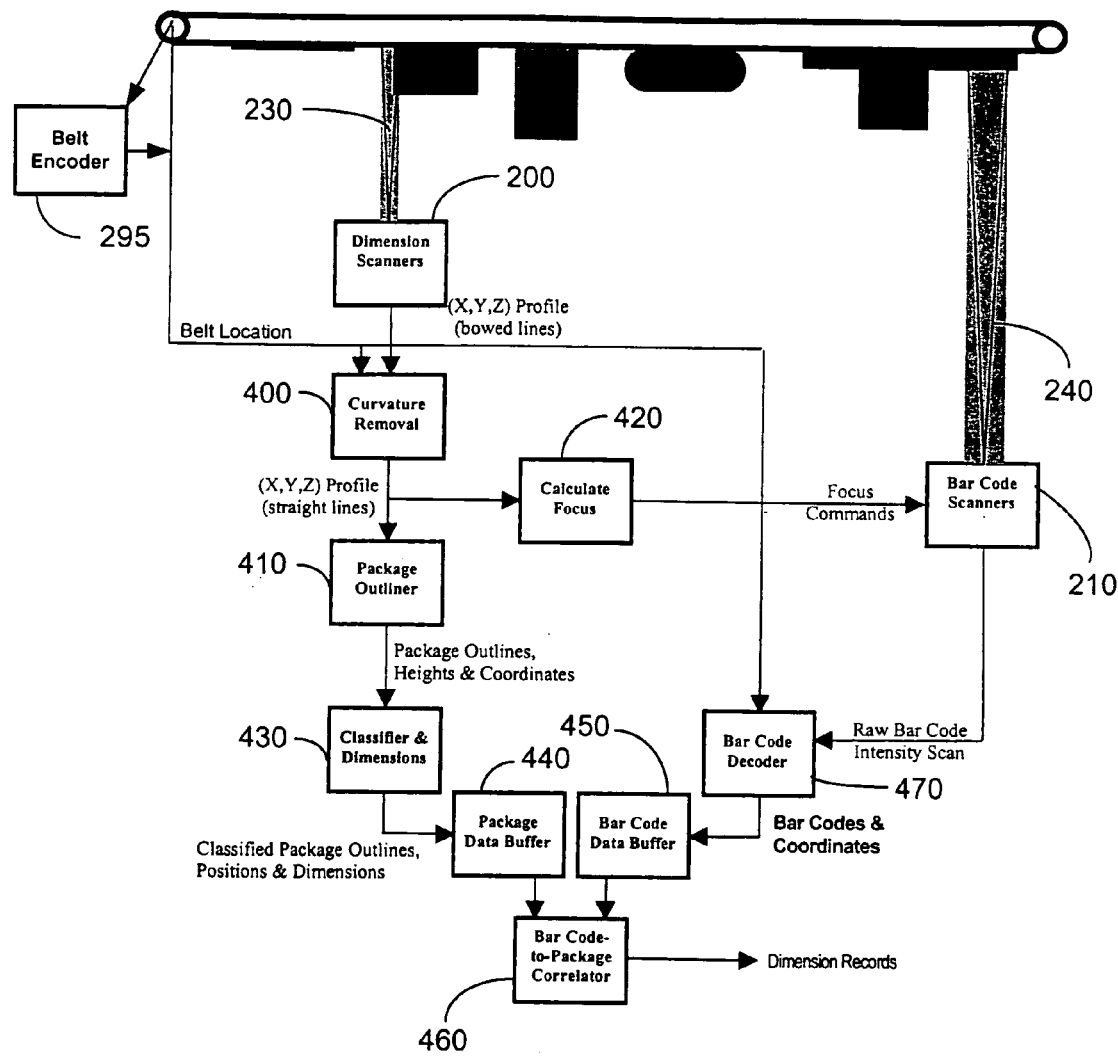
FIG. 4 illustrates the operation of an exemplary mass scanning and dimensioning system.

FIG. 4 illustrates the steps that are performed as packages 260 are processed along belt 250. Laser radar scanners 200 transmit their overlapping, curved, height scan profiles to MSDS processor 290, which performs a curvature removal algorithm 400 on the data.

Figure 5:
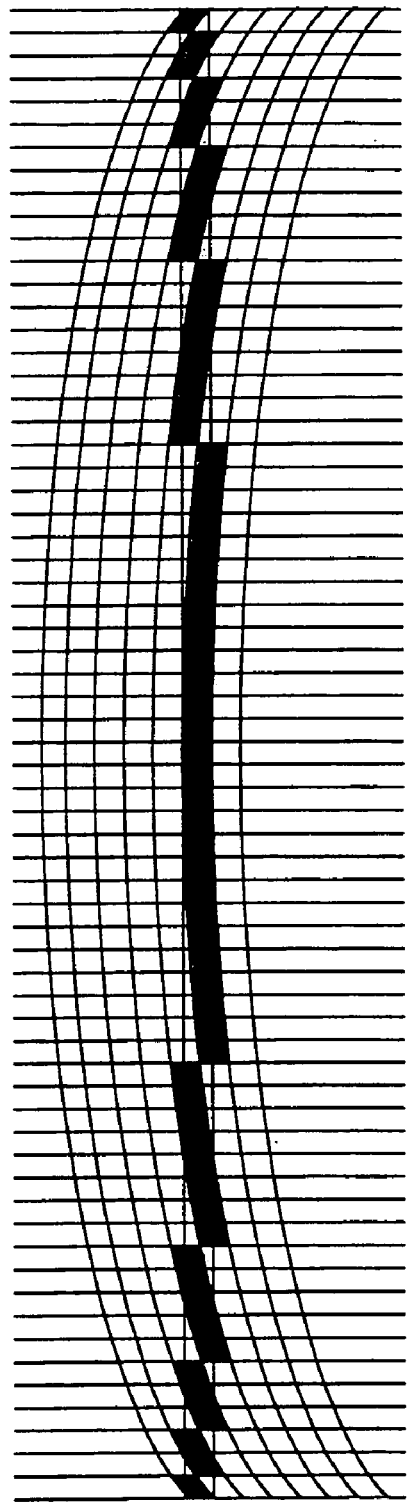
FIG. 5 shows a buffer for converting curved scan data into straight line data.

MSDS processor 290 running curvature removal algorithm 400 removes the scan curvature by selecting data from a circular buffer (not shown in FIG. 4) of the curved data to most closely approximate a straight line, as illustrated in FIG. 5. Once the precise curvature of each scanner 200 has been calibrated, the coordinates of the straight-line approximation are computed and can be used to repeatedly address the circular buffer.

The process of taking curved scan bows 230 from laser radar scanners 200 to produce a single stream of straight line data with a uniform sample size for purposes of this description is called "rectification." One method of rectifying curved data is performed as follows. A record of the belt position for each scan bow 230 produced by each laser radar scanner 200 is stored within the scanner 200. Transformation of the curved data into linear data uses the recorded location for the bow 230 stored in each scanner 200. For each pixel of straight line data to be calculated, the algorithm searches recent scan bows 230 to find the measurements that most closely bound the point to be reported. The pixels that result from the search are averaged using the proximity to the target point as a weighting value. The resulting weighted data is used to linearize the bow scan data.

Alternatively, instead of recording the belt position in the laser radar scanner 200, the belt position can be recorded in processor 290 (not shown in FIG. 4), which performs the rectification. By storing the position data at processor 290, a finite amount of variability may be incorporated in the measurement. The rectification algorithm can also be simplified by assuming that the array of scan bows 230 are uniformly spaced. The scan bows can be selected to simulate uniform sampling at a specific sample width. Using these simplifications, the required processing cycles are reduced. However, an error is imposed upon the data because available scan bows normally do not perfectly correspond to the intended sample positions.

In calculating the rectification, if the assumption of equally spaced scan bows is not made, an interpolation between available scan bows can be performed in order to provide data at different resolutions. Fewer scan bows will lower the precision of the measurement. However, the use of fewer scan bows will permit belt 250 to move more quickly (i.e., the use of interpolated data permits the system to trade off between high precision versus belt speed).

The straight-line data from curvature removal algorithm 400 is presented to a package outliner algorithm 410 and a calculate focus algorithm 420, which determine the perimeter coordinates for each package 260 and compute the focus heights for each of the bar code scanners 210, respectively. The perimeter coordinates are sent to a classifier and dimensioner algorithm 430, which computes package dimensions and establishes which package type is associated with the perimeter data. The bar code data is decoded by bar code decoder algorithm 470. The decoded bar codes are correlated with the package perimeter data in a bar code-to-package correlation algorithm 460, and the final dimension records are sent to a mainframe computer. A belt encoder 295 tracks belt motion for use by curvature removal algorithm 400 and bar code decoder algorithm 470.

Figure 6:
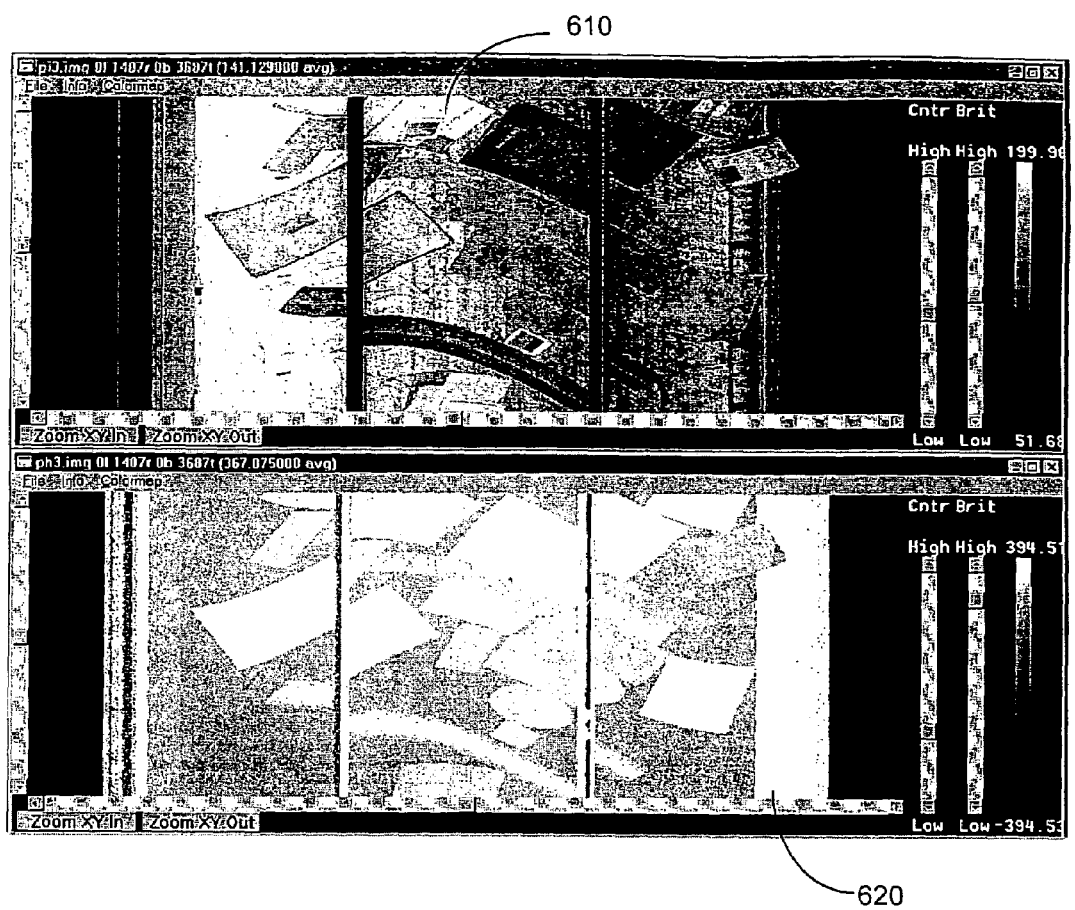
FIG. 6 shows exemplary data captured by the radar laser radar scanner of FIG. 3.

FIG. 6 illustrates raw, intensity-coded images of packages and package heights along a belt 250. The top image 610 is the intensity-coded image returned by three adjacent laser radar scanners 200. The bottom image 620 is a height-encoded image, where taller packages 260 appear lighter than shorter ones. The images appear bowed due to the curvature of the scan line 230. There is also overlap between the line scans of the scanners 200 because of the overlap of the areas scanned.

Figure 7:
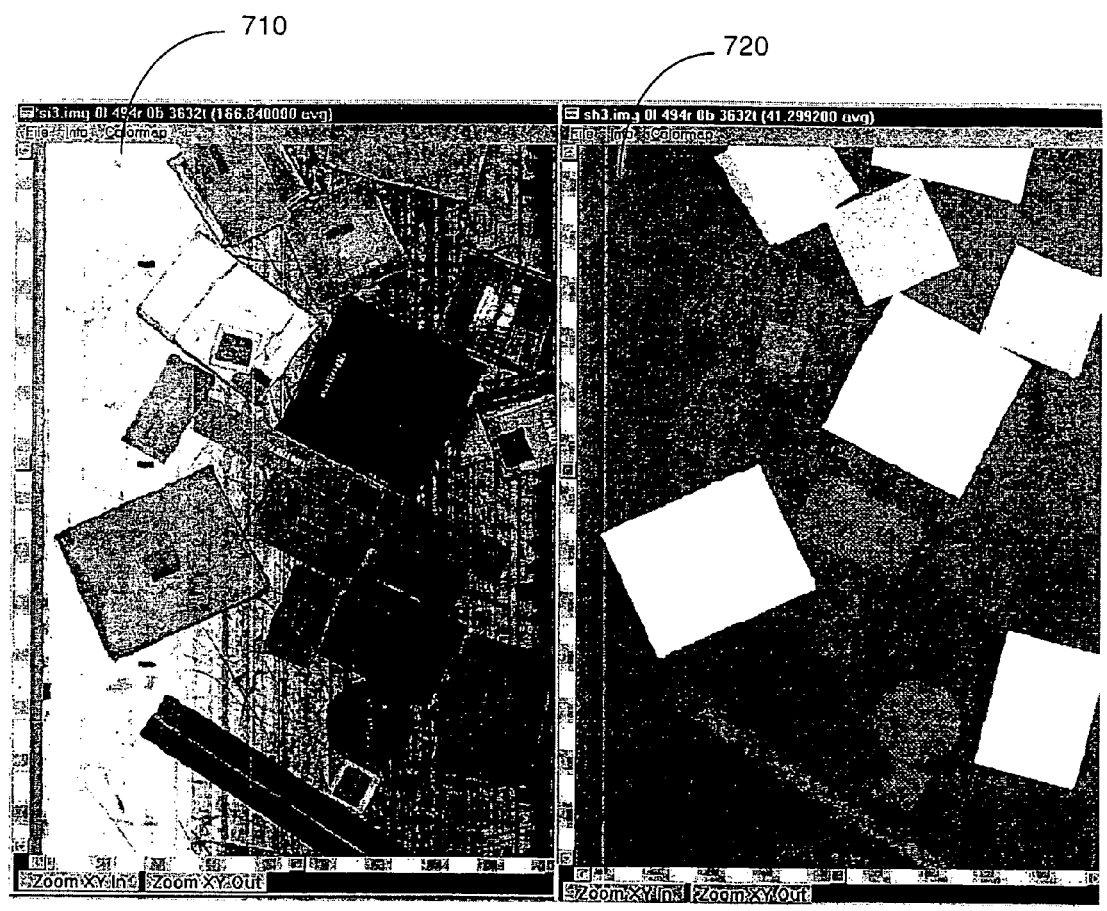
FIG. 7 shows exemplary rectified data captured by the radar laser radar scanner of FIG. 3.

FIG. 7 illustrates intensity-coded images of packages and height contour data, after the curvature removal algorithm 400 process is performed which removes the scan curvature and makes multiple scans appear as single, straightened images. The left image 710 and right image 720 are intensity and height images, respectively, corresponding to the data set illustrated in the top image 610 and bottom image 620 of FIG. 6. In the images of FIG. 7, the scan curvature and scanner overlap have been removed and rectangular packages actually look rectangular. Remnants of the curvature removal algorithm 400 are apparent in the edges of the tall (white) boxes, which appear somewhat fuzzy. However, this fuzziness causes insignificant errors in the resulting package dimension measurements.

Figure 8:
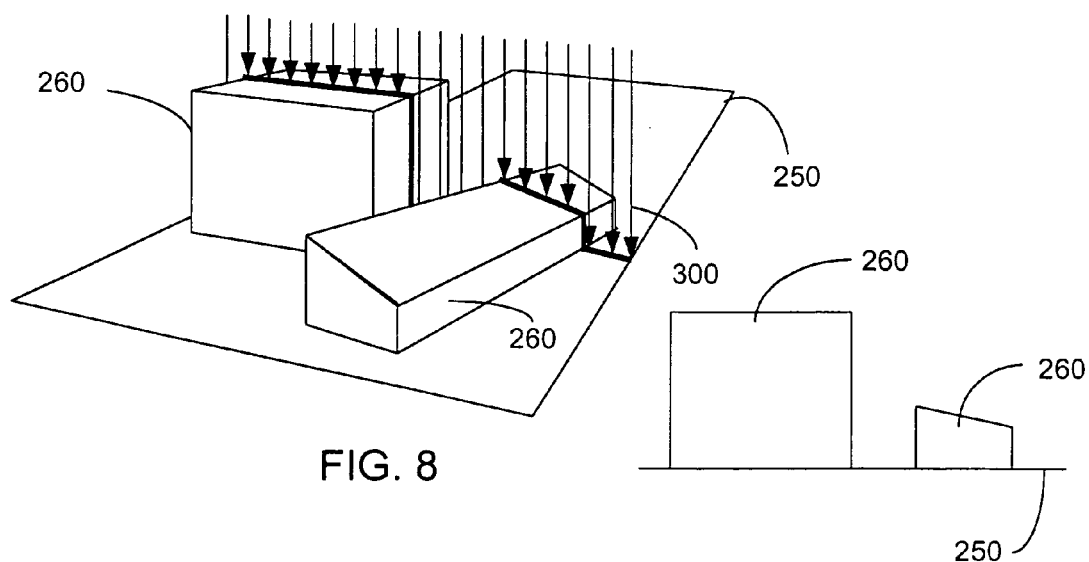
FIG. 8 illustrates operation of the radar laser radar scanner of FIG. 3 on non-singulated packages.

FIG. 8 illustrates the operation of a package height segmentation algorithm, which is part of package outliner algorithm 410. In real-time, as rectified height data is received, height pixels are grouped into height segments. If the height of a pixel is within a specified height segment threshold compared to the preceding pixel, the new pixel is included within that segment. If the height of the new pixel is approximately at belt surface level, no height segment is created.

A new height segment is created if the height of the new pixel differs from the previous pixel height by an amount exceeding a specified threshold. When parcels are singulated, new height segments are created as soon as the parcel boundary is determined and the height value of the pixel is greater than zero (i.e., the height of the conveyor belt). When packages are non-singulated, i.e., adjacent, new height segments are created due to the difference in package heights.

Height segments are represented by data structures that include the Y-position (indicated by the value representing the distance from belt encoder 295 at the time and position the height sample was taken), X-position (indicated by the pixel number of the height sample), and height value of each pixel included in the segment. Height segments are subsequently collected into height segment groups, which are dynamically linked lists of height segments.

Figure 9:
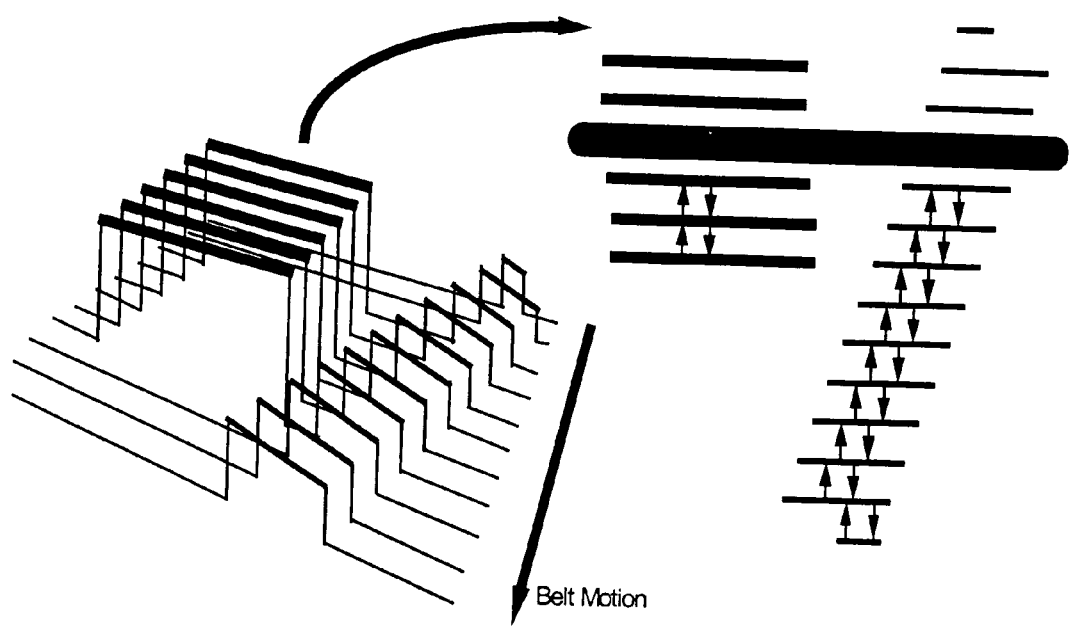
FIG. 9 illustrates the operation of an exemplary data processing algorithm on received height data.

FIG. 9 illustrates the operation of a package height segment matching algorithm, which is part of package outliner algorithm 410. After an individual dimension line scan of height segments has been determined as illustrated shown in FIG. 8, the resulting dynamically-linked lists of height segments are organized into two-dimensional height segment groups. New height segments are included into existing segment groups if the new segment overlaps the group and its height is the same as that of the group, within a specified tolerance.

Figure 10:
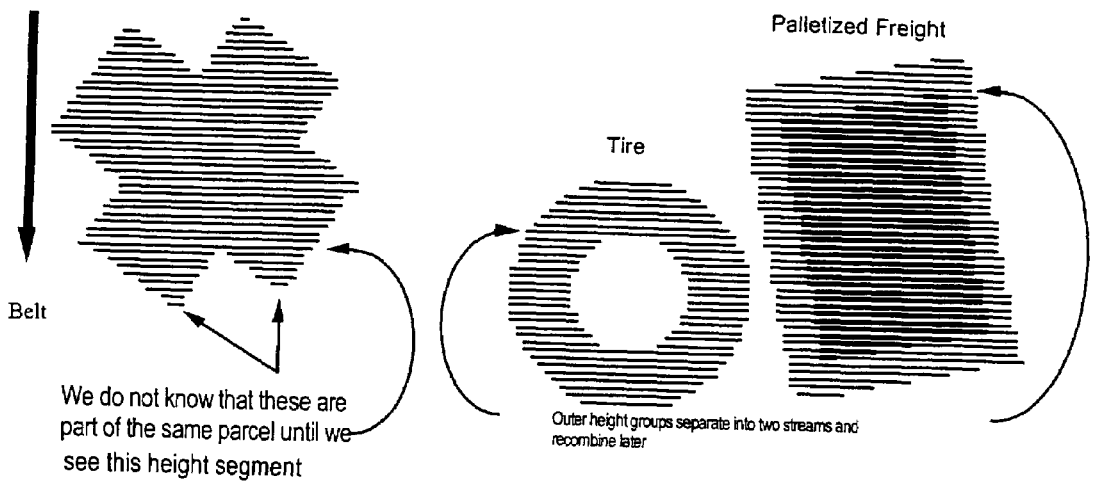
FIG. 10. illustrates the operation of a package height segment match algorithm.

FIG. 10 illustrates special cases of the package height segment matching algorithm discussed above with respect to FIG. 9. Certain three-dimensional package profiles result in MSDS 280 creating multiple height segments for an individual package. Examples include X-shaped, tires and palletized parcels, as illustrated in FIG. 10. Because height segments are created based on an analysis of line scan data, certain linear cross-sections produce linear scans having discontinuous height values, i.e., a single scan line of data across an object would appear as two separate objects. After height segment groupings have been collected for an entire package as shown in FIG. 9, a second pass is made through the data, as illustrated in FIG. 10. The second pass identifies isolated segments, i.e., segments that are separated in space and are of similar height, and attach them to overlapping height groupings of similar height. The resulting data set is a two-dimensional height segment group as discussed above with respect to FIG. 9.

Figure 11:
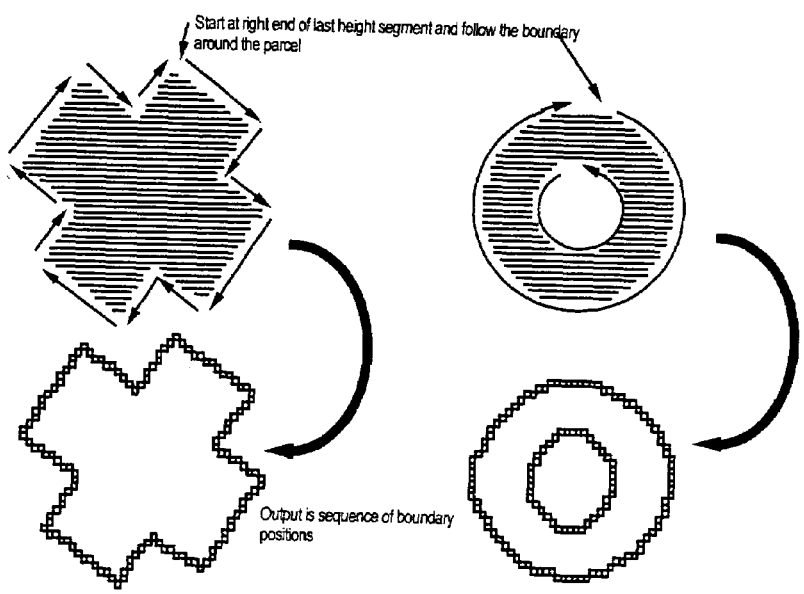
FIG. 11 illustrates the operation of an algorithm for circumnavigating package height segments.

FIG. 11 illustrates the algorithm for the circumnavigation of package height segments. The circumnavigation algorithm is part of package outliner algorithm 410. Once the last height segment of a package entity is placed into a two-dimensional height segment group as discussed above with respect to FIGS. 9 and 10, the circumnavigation algorithm "walks around" the perimeter of the two-dimensional height segment group, connecting together the end points of the height segments until it returns to the starting point. As the perimeter of the linked list is traversed, the perimeter is roughly fit to lines, using least-squares estimation techniques.

The result of the circumnavigation algorithm is reduced to three-dimensional perimeter point coordinates. Again, this data is stored as a dynamically linked list.

Figure 12:
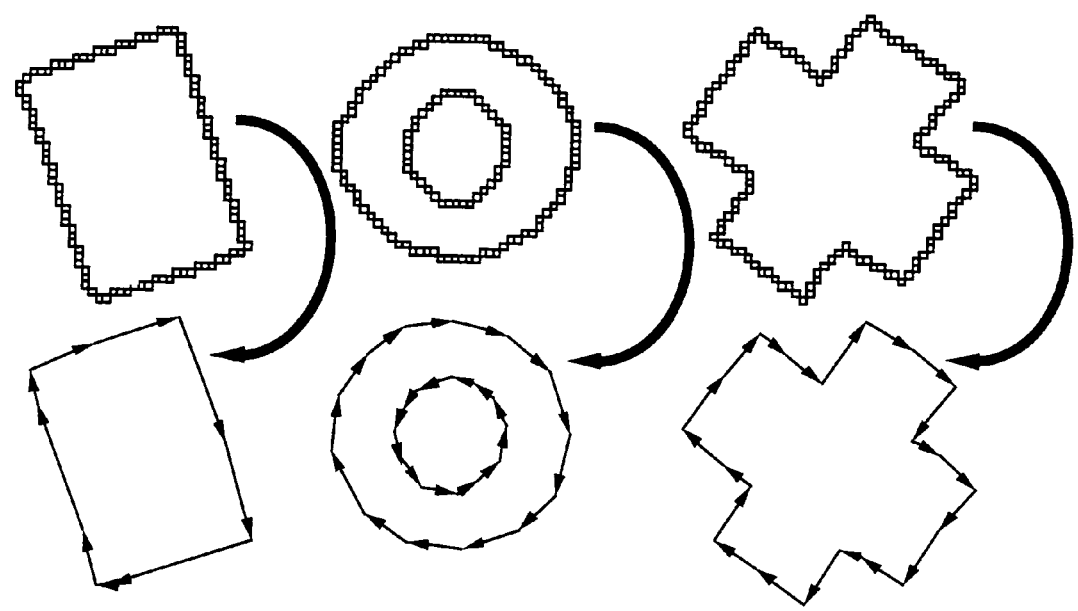
FIG. 12 illustrates the operation of an algorithm for fitting lines to package outlines.

FIG. 12 illustrates the algorithm for fitting lines to package outlines. The line fitting algorithm is part of package outliner algorithm 410. From a given starting point, the next point on the perimeter is connected to the starting point to create a line. The algorithm then attempts to connect the next point on the perimeter to that line. If the additional point results in the points being connected by a line within a specified tolerance, the line is kept and the algorithm passes to the next point. If, however, the addition of the next point causes the fit to exceed the specified tolerance, the additional point is deleted from the line fit terms and incorporated into a new line connecting that point to the next point on the perimeter. The process of adding new points to an existing line or starting a new line continues until the entire perimeter is processed. The resulting perimeter line segments are represented as a dynamically linked list.

The pixel neighborhood rules used above to determine whether a pixel should be included in a line generally yields a number of short line segments, representing one side of a rectangular box.

Figure 13:
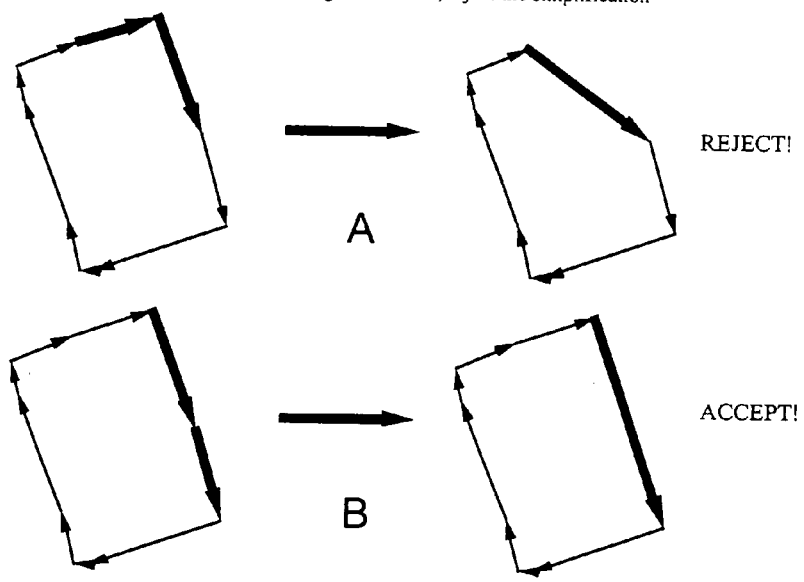
FIG. 13 illustrates the operation of an algorithm for simplifying a package boundary.

FIG. 13 illustrates a physical representation of a package boundary simplification algorithm. The package boundary simplification algorithm is part of package outliner algorithm 410. The starting data for the simplification algorithm is a polygon representation of the boundary in the form of N perimeter points. The perimeter points are the end points of the lines created by the line fitting algorithm discussed above. The area of the polygon is then calculated. The polygon is then altered by removing one perimeter point. The area of the new polygon is then calculated. The area of the polygon before removal of the point is then compared to the area of the polygon after the removal of the point. If the change in area is below a defined percentage threshold, as shown in FIG. 13B, then the new perimeter is discarded. If, however, the change in area exceeds the defined threshold, then the new perimeter is retained as shown in FIG. 13A. The simplification algorithm is repeated for each point. The resulting simplified package outline is stored in memory.

Figure 14:
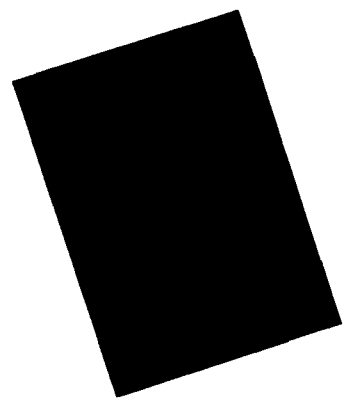
FIG. 14 illustrates exemplary rules for classifying package shapes.
Figure 14:
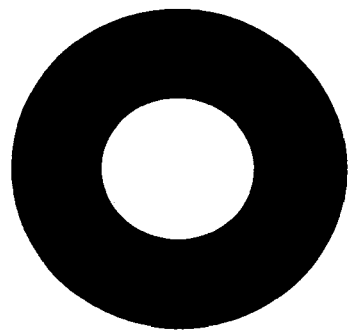
Figure 14:
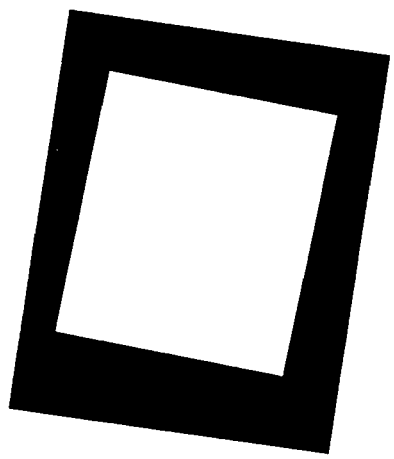
Figure 14:
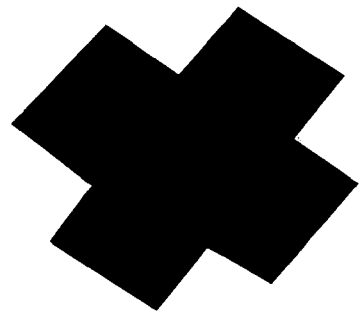

FIG. 14 illustrates four examples of package shape classification rules as performed by classifier and dimension algorithm 430. The input to classifier and dimension algorithm 430 is the simplified package outline from the package boundary simplification algorithm.

FIG. 14a illustrates the package classification rule for a rectangle. If a polygon has four opposite sides of approximately the same length that are nearly parallel, the shape is classified as a rectangle. FIG. 14b illustrates the package classification rule for a tire. If a shape is comprised of many lines and a fit can be performed consisting of two concentric circles then the shape will be classified as a tire. FIG. 14c illustrates the package classification rule for palletized freight. Palletized boxes appear as rectangular shapes enclosed within another rectangle whose dimensions are generally similar to standard pallet dimensions. FIG. 14d illustrates the package classification rule for an irregular shape. Irregular parcels exhibit signatures which don't fit into any other category.

The resulting classified package definitions of a package 260 are stored in package data buffer 440 along with the position and dimensions of package 260.

Once the data defining the scanned properties of a package are determined, MSDS 280 processes the resulting dimensions to assess the quality of the resulting data. The factor used to assess the quality of the data is called dimensional confidence, which is a determination of the "goodness" of the object measurement and model fit. For every object processed by MSDS 280 the dimensional confidence factor is calculated. The components of dimensional confidence are individual confidence values for the length, width, height and a model fit value. Dimensional confidence can be reported as the individual values or as an aggregate of all of the values. Length, width and height dimensional confidence values define how well the captured points for the length, width and height values of the scanned package fit to a straight line.

Model fit describes how well an object fits a pre-defined parcel definition. This would be performed, for example, by determining how well a package classified as cuboidal meets the definition of a cuboidal package. A parcel is recognized as cuboidal if it has sides that are straight, parallel, even, and bisections of the package through opposing corners produces bisections of equal length.

The fit of a package to the cuboidal definition is performed by determining if the package values are within a predefined error of the requisite definitions. The straightness of the sides that define the scanned package are determined by calculating the root mean square distance of the points that comprise the edge of the parcel onto a fit line. The value of the least square distance defines the accuracy of the scanned values to the fit line. A determination of "parallelness" of the sides is determined by calculating the angle of opposing sides with respect to each other. The evenness of the sides is determined by comparing the lengths of opposing sides. Finally, bisection of the package is determined by connecting the opposing corners of the packages and determining the lengths of the resulting lines. All of the resulting values must fall within a configurable threshold in order to provide an acceptable classification of the package.

Parallel to the process of determining the dimensions of packages 260 using laser radar scanners 200, as shown in FIG. 4, bar code scanners 210 operate to recognize the bar codes located on packages 260 along with the coordinates of the bar codes. Unlike the laser radar scanner 200, the bar code laser beams 210 are not projected vertically, so package shadowing can occur. However, shadowing effects are mitigated by using multiple, overlapping scans. Such spatial redundancy normally results in multiple scanners 210 reading each bar code 270, so that at least one bar code scanner 210 reads each bar code 270, even when bar code 270 is blocked or shadowed with respect to one or more scanners 210.

Each of the bar code scanners 210 scanning for across a belt 250 is independently focused using height profile data across the belt in the vicinity of the associated scanner 210, as determined upstream by the laser radar scanner 200. Because the bar code scan beam is not projected vertically, the actual focusing depth-of-field is greater than a single package height. This is taken into account in the calculate focus algorithm 420, such that a single scanner 210 can determine data from a range of package heights.

Along with the collection of bar code data from a package, MSDS 280 correlates the collected data with the package data derived from laser radar scanners 200. In order to determine the three-dimensional position of a bar code 270, MSDS determines the instantaneous projection of the bar code laser scan when a bar code 270 is detected and read. To make this possible, the three-dimensional ray trace of the bar code scanners 210 has been characterized by calibrating the bar code scanners 210, as described below. Each bar code scanner 210 reports the position of its scan motor when a bar code 210 is read. That information is used to establish the scan ray angle. The bar code position is computed as the intersection of the scan ray and the height profile landscape.

Once bar code data identifying a package is correlated with the dimensional data produced by laser radar scanners 200, the data can be used for billing packages 260 according to their dimensions (dimensional weight), to improve package processing operations within and between facilities by optimizing conveyor belt utilization and personnel requirements, and by optimized loading of containers onto trucks, trains and aircraft. MSDS data can also be used to control robotics for automated labeling, marking and diverting of non-singulated packages.

As explained above, MSDS 280 comprises several components capturing different categories of information about the packages 260 being processed. The two main categories of information are package dimensions and machine-readable codes. For proper package processing, the two types of data should be associated with each other. FIGS. A and 15B respectively show examples in which the two categories of information are properly correlated and improperly correlated.

Figure 15:
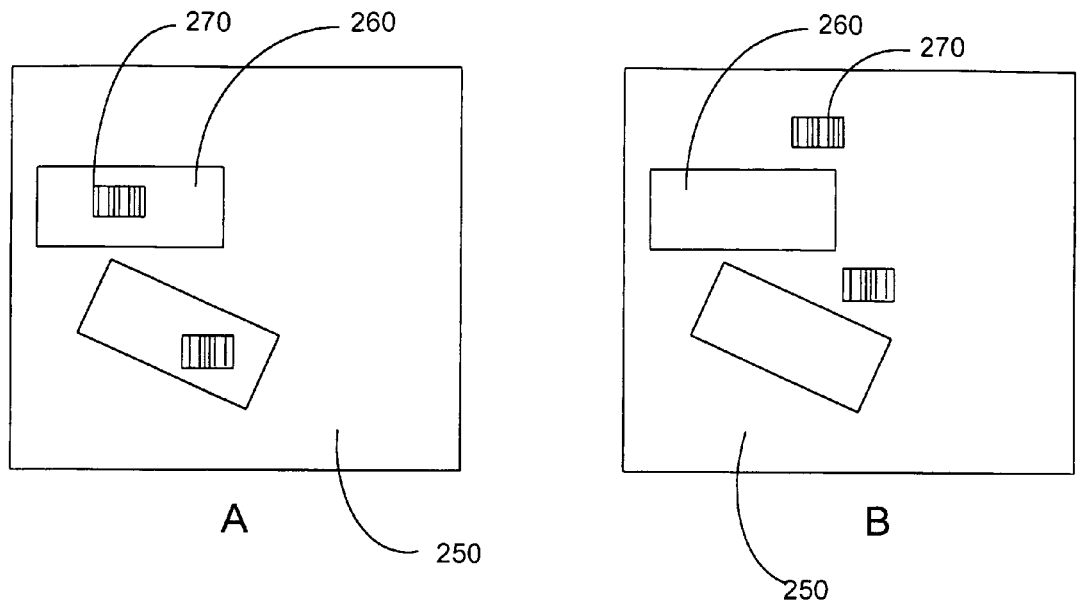
FIG. 15 shows two exemplary attempted correlations between bar codes and package outlines.

FIGS. 15A and 15B illustrate system-reported placement of a machine-readable code, for example, a barcode, with respect to package outline information. FIG. 15A shows a correctly calibrated system, in which the machine-readable code information and the package dimension information are properly correlated. FIG. 15B shows a system that is not correctly calibrated, in which the machine-readable code and the package dimension information are not properly correlated. As shown in FIG. 15B, the position of the bar code is consistently outside of the outlines of determined packages. Failure to correctly relate the two types of information would prevent a number of applications, such as collection of dimensional revenue, and package sort optimization.

In order for the machine-readable code information and the package dimension information to be properly correlated, it is necessary to calibrate MSDS 280 after installation. The calibration builds a computer model of the characteristics of the system, which are used to translate from actual readings to idealized readings which are perfectly straight and consistent. A number of effects are measured and corrected, including encoder position, height offset, facet correction, bow correction, machine-readable code placement, and the matching of laser radar scanner position data and bar code scanner position data. The scanning elements of MSDS 280 are calibrated in order to ensure that the measured data received corresponds within the tolerances of the information scanned.

In order to correctly determine the position of an package 260 along conveyor belt 250, an encoder 295 is calibrated. Position is determined by belt motion, which is measured by a shaft encoder 295 connected to a roller on conveyor belt 250. When belt 250 moves the roller turns and shaft encoder 295 turns with it. For each small angle of motion in shaft encoder 295 an electrical pulse is produced which is counted inside the processor 290. How these pulses correspond to belt motion depends on the construction of encoder 295 and the radius of the roller where it is connected.

Calibration of encoder 295 can be performed, for example, by connecting a piece of masking tape across the edge of conveyor belt 250 and onto the tray (not shown) over which it slides. The tape is cut so that one part will stay on the belt while the other remains fixed to the tray. At this time the count of encoder pulses is set to zero. The belt is moved forward 10 or 15 feet and stopped. The number of pulses is recorded and the distance between the two pieces of tape is recorded. The result of encoder calibration is the number of pulses per inch, which is calculated by dividing the measured number of pulses by the measured inches.

A second element of MSDS 280 that requires calibration is laser radar scanner 200. Laser radar scanners 200 are calibrated, for example, for three values: height offset, facet correction and bow correction.

There are two sources of correctable errors in height measurements. One is the physical placement of each laser radar scanner 200 within the whole MSDS system 280. Each MSDS has one or more scanners which are mounted independently. The other source of error is a consistent difference in height for different pixels within each scan line 230. This is especially true close to the scan edges.

The height correction is made by scanning a flat board stationarily fixed on the belt. Several thousand scan bows are collected and the heights at each pixel position are averaged. For each pixel position across a scan bow the corrected height can be determined using the equation:

$$h_c = h_m - h_a + h_b$$

Wherein $h_c$ is the corrected height, $h_m$ is the measured height, $h_a$ is the average height measured from the board, and $h_b$ is the height of the calibration board. The resulting corrected height is used as the offset for height measurements.

Figure 16:
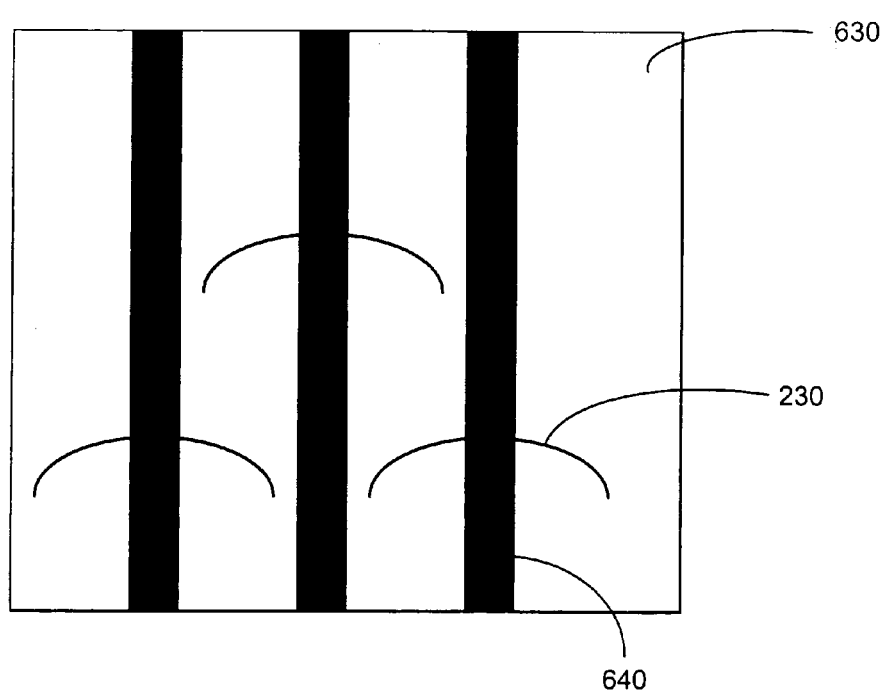
FIG. 16 shows an exemplary calibration board for facet correction.

The second calibration performed on a laser radar scanner 200 is facet correction. Spinning polygonal mirror 340 shown in FIG. 3 has differences in the reflecting characteristics of each of the different facets. There are enough differences between the facets of the spinning polygonal mirror 340 so as to produce flaws in scan lines which correlate to the facets. These flaws show up as scan bows from different facets being displaced across belt 250 relative to each other. Measurement of this displacement can be performed, for example, using a calibration board 630 having black strips 640, as shown in FIG. 16. The board is scanned using laser radar scanner 200. The black strips 640 of board 630 are placed so that there will be a clear light to dark transition within the view of the scan pattern 230 of each laser radar scanner 200.

Facet calibration board 630 is scanned in the intensity mode by laser radar scanner 200, resulting in white to black signal intensity transitions. The transition is the point where intensity crosses the average between the white and black regions. The exact point may be between pixels according to the following formula:

transition=$L+(I_a-L)/(L-R)$ where L is the intensity of the pixel to the left of the transition, R is the intensity of the pixel to the right of the transition and $I_a$ is the average pixel intensity.

Facet correction values are calculated by subtracting the lowest transition values from all of the transitions. Typical values range from 0 to 3 pixels. To correct scan data this correction value is added to the reported pixel index. Fractions are evaluated by taking an average of the two nearest pixels weighted by their proximity to the desired index.

corrected pixel (index)=raw pixel (index+correction value)

The final calibration of laser radar scanners 200 involves correcting for differences in the scanning bow 230 of scanners 200. The bow correction deals with placement of the laser radar scanners 200 and differences between their associated mirrors 320. It also provides straight scan data for processing by parcel recognition algorithms.

Figure 17:
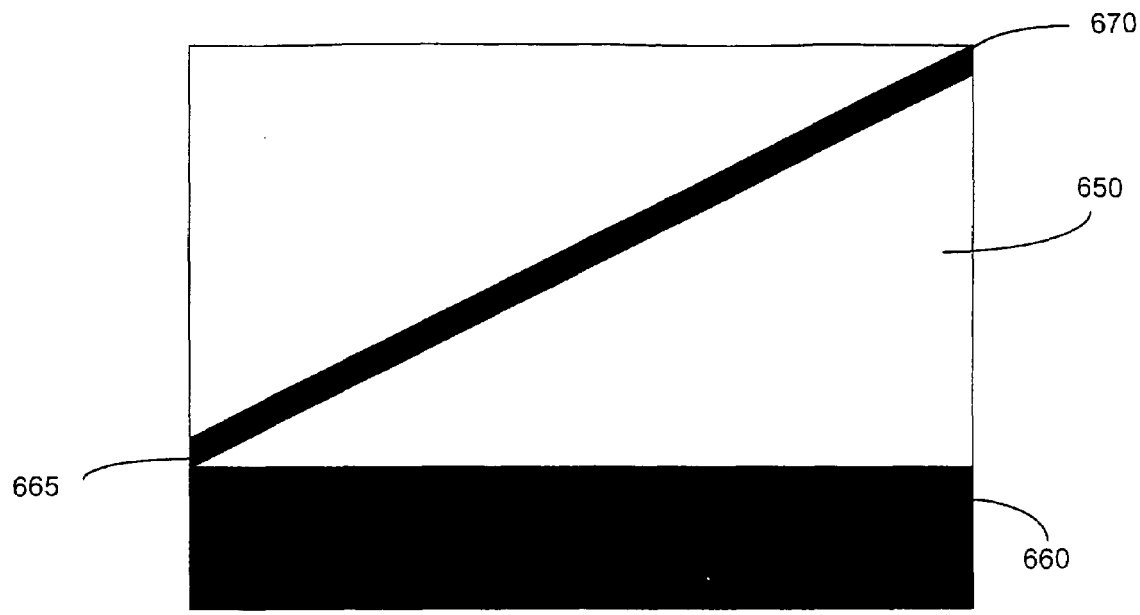
FIG. 17 shows an exemplary calibration board for bow correction.
Figure 18:
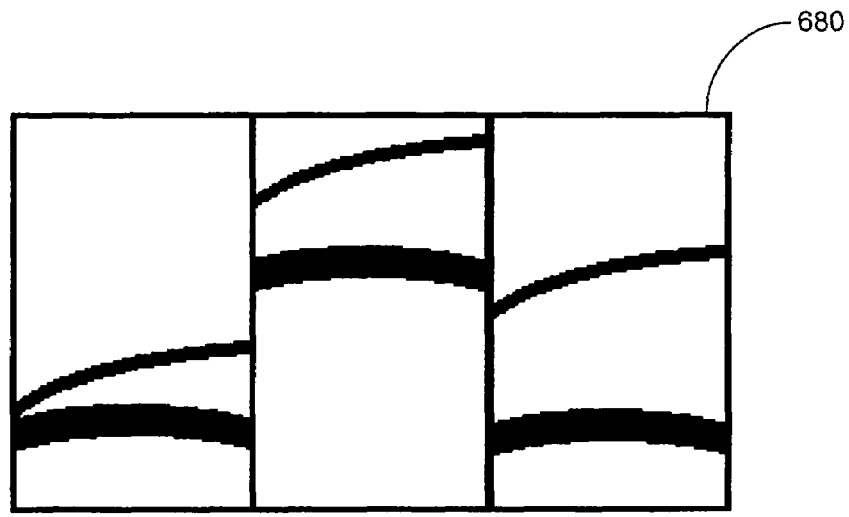
FIG. 18 illustrates exemplary data from a scan of a bow correction calibration board.

FIG. 17 shows an exemplary bow correction board 650. Bow correction board 650 is run through the laser radar scanners 200. The raw data delivered by laser radar scanners 200 can be broken into separate pieces for each scanner 200 and need not be straight. FIG. 18 shows results 680 for one instance. The correction is accomplished by building a lookup table which tells which height pixels are closest to a desired point in a straight and corrected coordinate system. During normal operation the corrected image is constructed by traversing this table to identify four pixels in bowed data space. These four pixels in bowed data space are averaged to produce a data pixel. As discussed above, each scanned area of the surface of the object can be used to produce two types of data, image data and height data. The resulting corrected data pixel may be a rectified height or an image pixel. As discussed above, the rectified height pixel contains information about the distance from the height scanner to the top surface of the scanned object. This information is translatable into the height of the interrogated area on the object. The image pixel data corresponds to the intensity value of the reflected light from the interrogated area of the object.

In order to perform the bow correction, the position of a pixel across belt 250 is determined by measuring the distance down belt 250 between thick horizontal strip 660 and narrow diagonal strip 670. The slope on the diagonal strip 670 with respect to horizontal strip 660 has a ratio of 1:2 so the cross-belt distance from the vertex is simply twice the down-belt distance between the strips. The distance down belt 250 is known directly from the shaft encoder 295 connected to the conveyor belt 250 itself. Encoder 295 is read for every scan bow 230 as it is captured. The position of a laser radar scanner pixel down belt 250 is the same as the transition from black to white for thick black strip 660. These positions are relative to the vertex point 665 of the strips 660, 670 of the calibration board 650.

The bar code scanners 210 must also be calibrated. In order to correctly associate bar codes 270 with packages 260 the bar code locations are needed. The position of a bar code scanned by a bar code scanner 210 is determined using the angle of the scanning laser at the center of the bar code and a position determined by the encoder 295 at the time of the scan. The angle of the scanning laser is used to determine the relative position ("Relpos") of the center of the bar code 270 with respect to the scanner 210.

Figure 19:
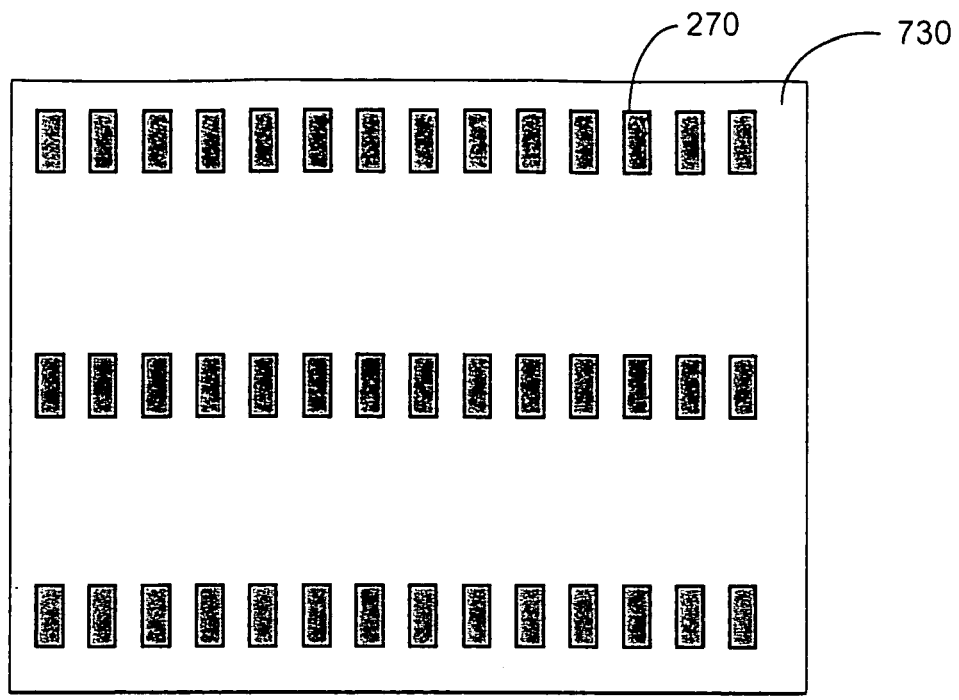
FIG. 19 shows an exemplary calibration board for bar code position.
Figure 20:
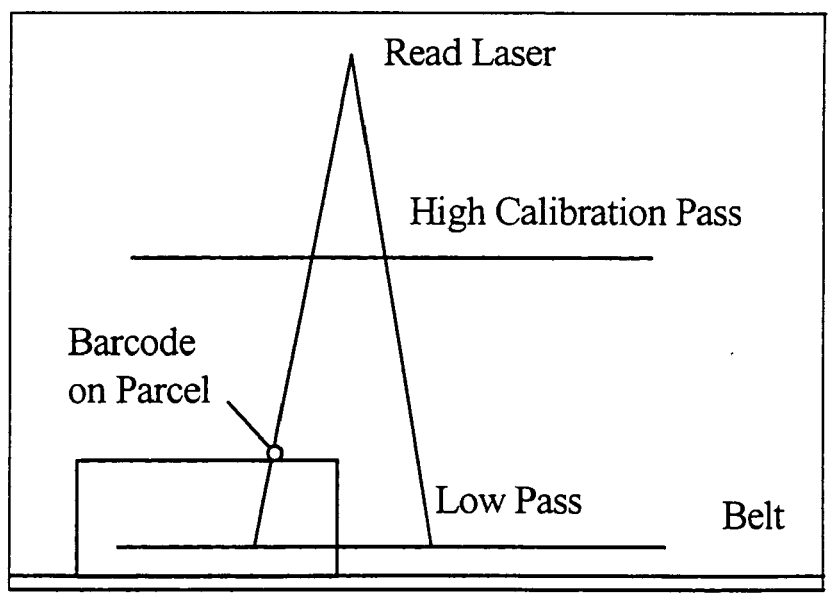
FIG. 20 illustrates a process for using a bar code position calibration board.

In order to calculate correct bar code placement from these observations it is necessary to know the path of the read lasers that produce scan lines 240 and how that path relates to Relpos. This is determined by scanning a large board with many bar codes placed in known locations. An exemplary board 730 is shown in FIG. 19. As shown in FIG. 20, the scan is repeated with board 730 placed high and low but at exactly the same position across and down belt.

Each of the bar codes 270 is unique and board 730 is built with each bar code 270 in a precise location. This means that for every read in the calibration pass each bar code's actual location is known relative to all of the others. Two distinct reads for a scan line 240 define a line through which the read laser passes. The relationship between Relpos and this line is assumed to be linear, which is a good approximation when the scan angle is small. This scan line and the relationship between location on the line and Relpos is calculated at two heights based on the calibration board 730 being run twice.

To ensure a good calibration at least three reads per leg are required at both heights. The best fit lines are calculated and root-mean-square error calculated for the fit. If the RMS error exceeds an application-specific threshold of accuracy for any leg, the calibration is rejected and must be repeated. Typically the threshold will range from ¼ " to 1".

All of the above provides a model for placing a bar code 270 on a ray beginning at the bar code scanner 210. The correct parcel 260 is found by walking along the ray out from the bar code scanner 210 looking for a collision with height above the belt 250. This height profile is provided by the laser radar scanners 200. The first collision is the parcel 260 labeled with the bar code 270 and the location of the collision is the three dimensional (3D) location of the bar code 270.

The calibrations for laser radar scanners 200 and bar code scanners 210 each produce their own coordinate systems. The origin of laser radar scanner 200 is at the vertex 665 of the bow correction board 650 while the bar code origin is centered on a specific bar code. A single unified coordinate system for the MSDS 280 as a whole is provided by scanning a special box known as the "brick." This box has a single bar code in the center. Several scans are averaged and the final coordinates are based on the resulting position determination of the bar code on the surface of the brick.

MSDS 280 enables the production of a great deal of information about the items scanned. The data capture is driven by application requirements and can be configured independently. It is configurable by category, allowing for category-specific limits. The following are categories of data that can be determined and presented to a user by MSDS 280. As discussed above, the dimensions of a package are determined by processor 290 using the data produced laser radar scanners 200. The same data in conjunction with data from belt encoder 295 is used to provide a location of the package coordinates within system defined coordinate system.

The data output from bar code scanner 210 can also be used to provide important information about a package 260. The location of machine readable code within system defined coordinate system may be determined. Further, the machine-readable code itself provides information that includes at a minimum a package identification number. It will, in most cases, in addition, include portions or all of a package destination address, service, and handling. Because more than one bar code might be located on a single package, the total number of machine-readable symbologies found within a package outline can be determined.

Placement of the MSDS systems is also an important consideration in the setup of such systems. By placing the MSDS 280 relative to the package induction belts (the belts that bring the packages into a facility) information capture coverage is ensured for the entire facility. The number of packages that enter the facility via an induction belt having an MSDS 280 can thereby be determined. The number of packages that enter the facility grouped by target package categories or total package volume can also be determined. These values are calculated by adding all individual capture-points within facility.

Figure 21:
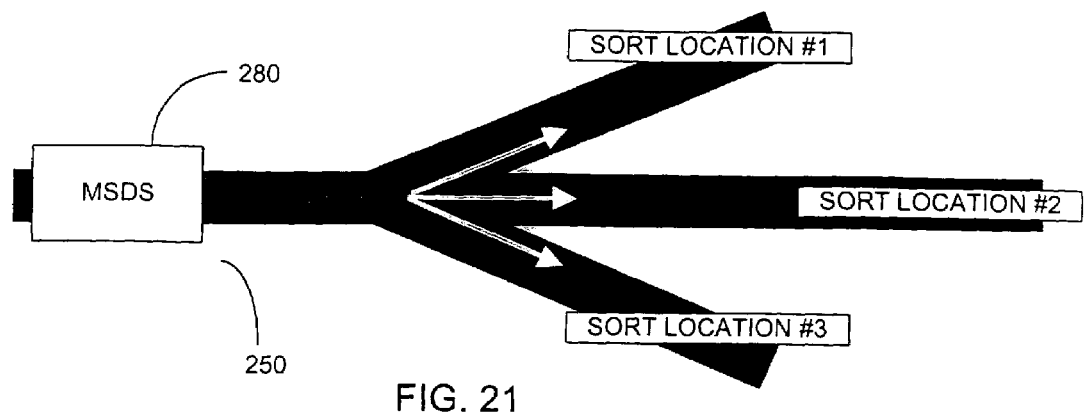
FIG. 21 shows the intra-facility MSDS information capture point to sort location relationship.

The total number of packages and volume of the packages by intra-facility sort location can also be determined. This requires the machine-readable codes to be captured from each package 260 since this will decide to which sort location within the facility the package will be sent. FIG. 21 shows the capture point to sort location relationship.

If complete capture of the machine-readable code is not feasible, the total flow to intra-facility sort locations can be estimated from read packages. The sort-location of records where the machine-readable symbol is not captured will be assumed to follow a normal distribution. To estimate volume impact of records where dimensions were not captured is more complicated. First, it must be determined if any limit has been established for capture of dimensions. If such a limit exists it can be assumed it will bias the population of records. In most cases, a physical inspection of the package flow will be required to determine average attributes of the packages. If the MSDS capture point is located significantly away from the individual sort locations, the volumetric information at each sort location can be access through the network. This can be driven by a secondary capture of the machine-readable code followed by a database lookup of the record. It can also be estimated from belt speed and final intra-facility destination of the individual package if this can be derived from the machine-readable code. There may be cases where the capture of MSDS information occurs in a totally separate facility for use by other facilities.

Manning requirements at manual intra-facility sort locations can also be estimated based on the flow parameters described above. The average capacity of a manual package handler will then be used determine how many handlers are required at each location to contend with the volume of packages to be processed at that location.

Figure 22:
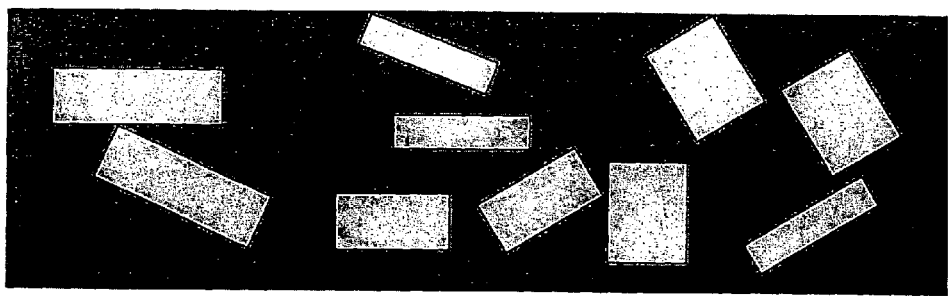
FIG. 22 shows exemplary distribution of packages across a conveyor belt.
Figure 23:
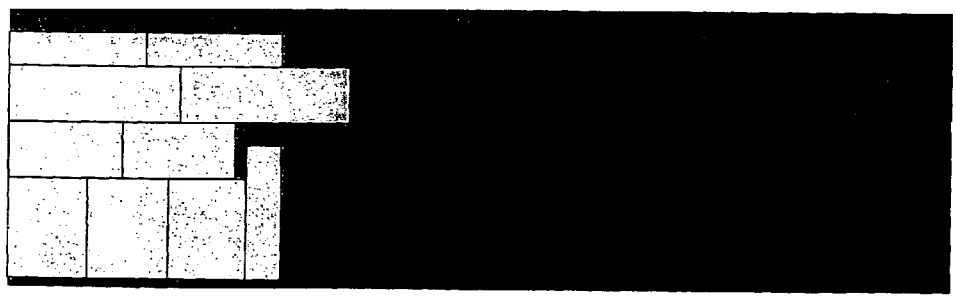
FIG. 23 shows exemplary optimized conveyor belt usage.

The data produced by MSDS 280 can also be used to determine belt utilization. Belt utilization is a calculation of the relative amount of space on a belt 250 used by packages 260. In a facility that depends on conveyor belts to transport packages, belt coverage is a measure of facility capacity, i.e., belt coverage indicates how much productive belt space is available, given the size of packages conveyed. It can be calculated by dividing the total package outline area by available conveyable belt area over a target region. To account for parameters such as the variety of package shapes and operator belt-loading patterns, an efficiency factor can be incorporated in the calculation. FIG. 22 shows basic package outline to belt coverage. FIG. 23 illustrates optimum belt coverage and shows available belt space under near optimum conditions. Package characteristics are identical in both cases. Even in this example, it is apparent how package shapes limit optimum belt utilization, hence the need for the efficiency factor.

Intra-facility flow modeling can also be performed. The captured data allow for extensive analysis of flow patterns within the facility and can be used to enhance overall facility effectiveness. The same benefits can be realized for a target portion of total package population by installation at central locations within the facility.

Figure 24:
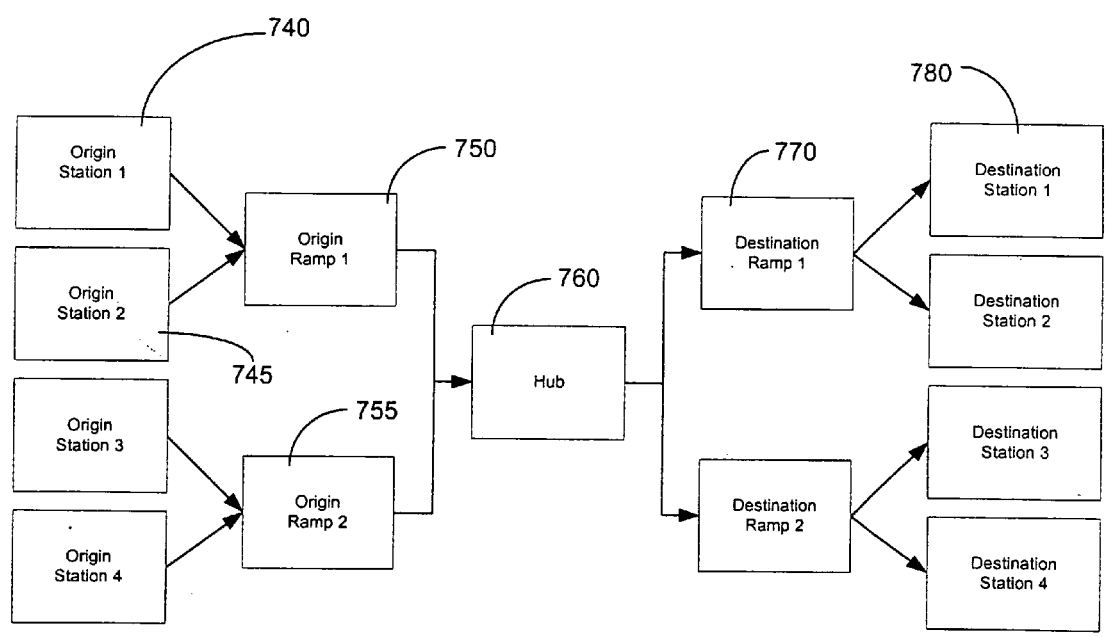
FIG. 24 is a block diagram of package flows between package handling facilities.

FIG. 24 shows typical inter-facility package flow in a hub-spoke system. Dimensions, corresponding package tracking number and destination address are captured at origin station 740. All captured information is forwarded to a central database (not shown) for load analysis across the package transportation infrastructure. All facilities downstream from the capture point including origin ramp 750, hub 760, destination ramp 770, and destination station 780, can use inbound piece count and volumetric measurements to estimate manning and equipment requirements. This extends to the destination courier (not shown). If downstream capacity has been determined to be exhausted, packages can be re-routed. Examples of resource optimization include truck and van loading. For this discussion all equipment used to transport packages will be referred to as "containers." The number of containers can be estimated by combining the individual package-record information grouped by inter-facility package-movement requirements. Using the volumetric capacity of each category of containers and the total package volume by route segment, the number of containers by route segment can be estimated. A container-load efficiency factor is applied to account for non-optimized container loading, i.e., the actual shape of packages to be shipped in a particular load would preclude the use of all available space.

Using the inter-facility load analysis, package movement optimization can be performed. The captured information allows for selection of the optimal downstream facility for the processing of packages in transit. The proximity to each downstream facility is weighted against individual facility capacity and characteristics of inbound package flow. As shown in FIG. 24, if the captured MSDS data from origin station 740 and origin station 745 indicate that origin ramp 750 capacity will be strained, packages can be diverted to origin ramp 755. This allows for optimizing the utilization of each facility so as to avoid overburdening one facility while allowing another to operate below capacity.

Figure 25:
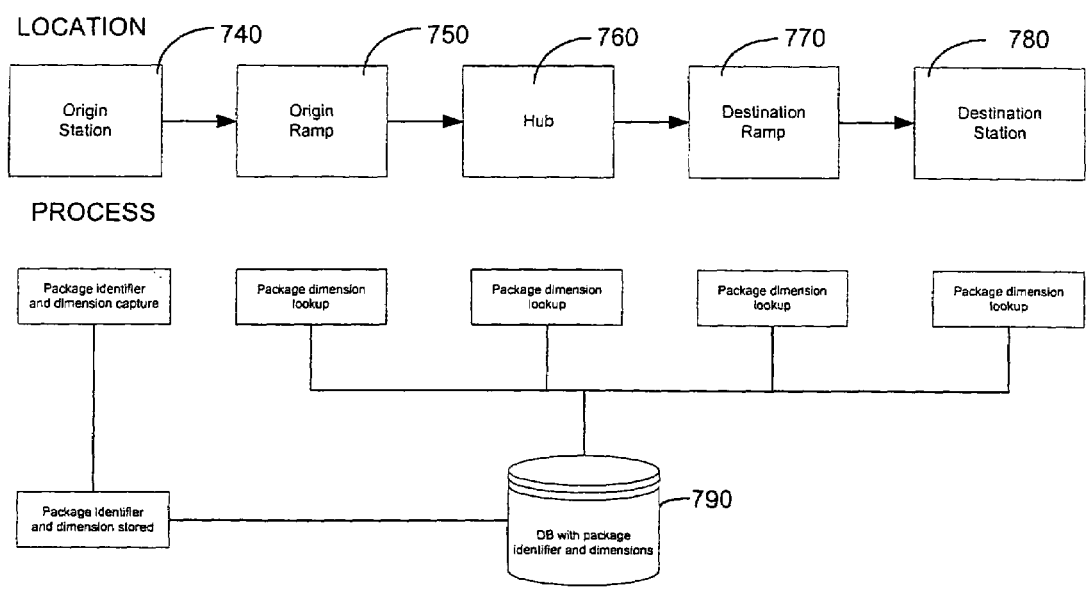
FIG. 25 is a block diagram of data flow between package handling facilities.

Inter-facility package flow data can also be used to optimize package movement equipment loading between each facility. This is slightly different than the intra-facility optimization described above. Instead of examining the loading of one container at a time, the optimization of package movement analyses overall package movement and available resources at each node from origin to destination. Supplementing this information stream with package physical weight data further enhances the ability to optimize package-moving resources. As shown in FIG. 25, each of the locations downstream from origin station 740 (i.e., origin ramp 750, hub 760, destination ramp 770, and destination station 780) have access to the information detected at origin station 740, which is stored in package information storage 790. MSDS information can be captured anywhere in the distributed facility network, however, as shown in FIG. 25, benefits increase when the capture of package dimension occurs closer to the package's origin since it then covers the maximum number of facilities. FIG. 25 shows the optimal capture and data flow configuration in a hub-and-spoke system, as described earlier. Database lookup of dimensions based on the package identifier can be performed using the stored information. When dimensional information has been captured at the induction belt, subsequent systems need only capture the package identifier using a bar code reader 210 and do a lookup from memory to establish the characteristics of the package in question.

Figure 26:
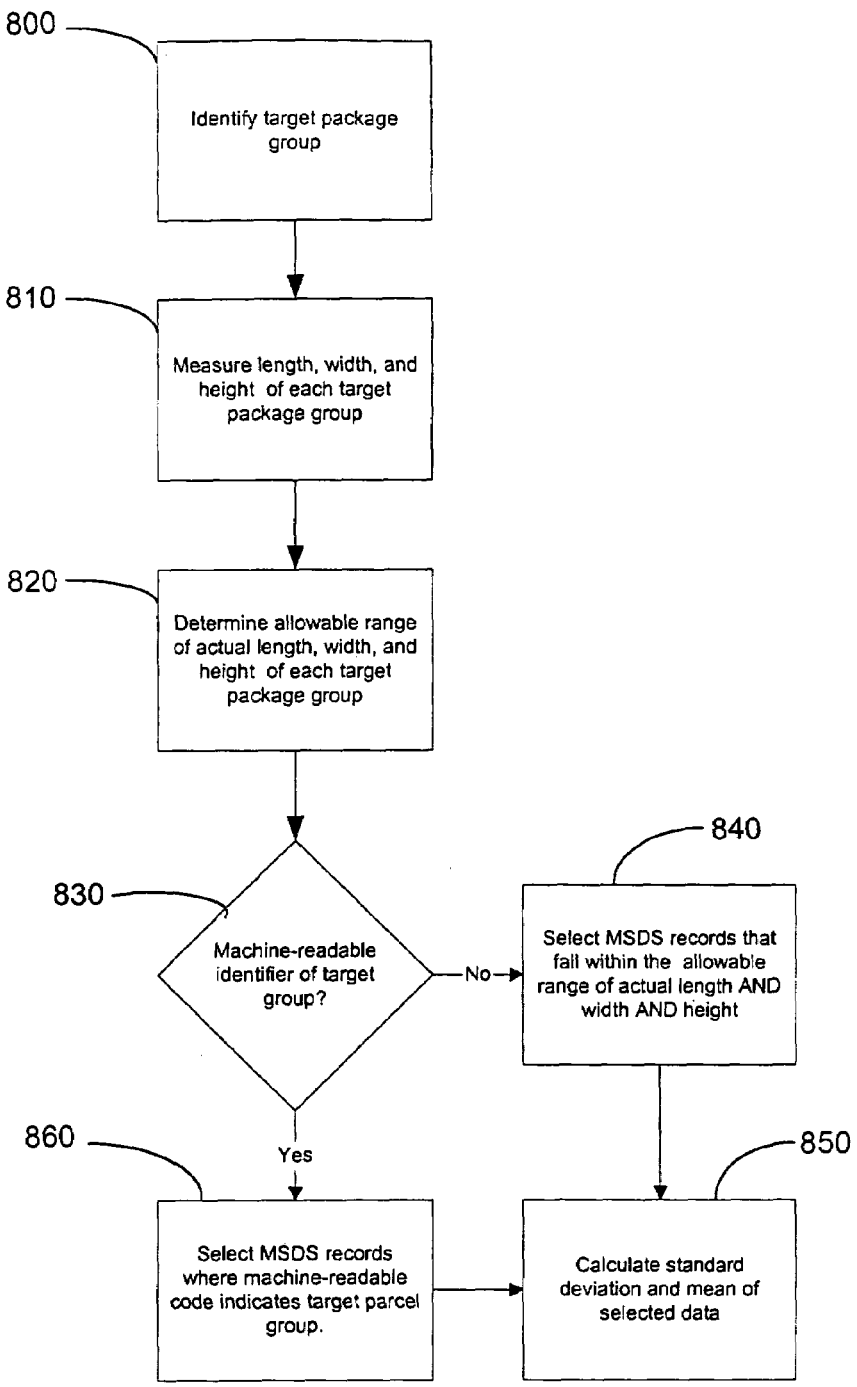
FIG. 26 is a flow chart of accuracy tracking in an MSDS system using a package of known size.

Once an MSDS 280 is in operation, periodic checks of the accuracy of the information gathered by the system may be performed. FIG. 26 shows a flow chart for one method of accuracy determination for the MSDS. In step 800, the system identifies a target package group. Next, the length, width, and height for the target package group is measured from a package that represents a pristine and dimensionally stable representative of the package group (step 810). If such a package does not exist, a sample of packages are measured and the mean of the captured dimensions are used. The system accuracy is derived from how packages in the category are measured relative to the mean. Packages will be defined as being part of the target group by two methods: machine-readable information may be used to place packages in categories, and/or packages may be categorized by the dimensional characteristics of the package. By defining a maximum and minimum possible value for each dimension, it becomes possible to identify the package as a likely member of the target package group.

Maximum and minimum sets of allowable ranges of actual length, width, and height of each target package group are then determined (step 820). In step 830, the system determines if the package target group has a machine readable identifier (e.g., a bar code). If a machine readable code is available, the MSDS records corresponding to the target group are accessed (step 860). However, if no machine-readable code is available, and if the MSDS record falls within the allowable range of actual length, width, and height it will be selected as a member of the corresponding target package group (step 840). After an MSDS record is selected, the standard deviation and mean of the selected data is calculated (step 850). The standard deviation and mean provide a measurement of the accuracy of the MSDS system. If the mean calculated from the system's captured values deviates from the standard mean, and standard deviation remains low, it can be assumed that the system is no longer operating at peak performance. The method does assuming a normal distribution.

The use of known box sizes in the process of FIG. 26 ensures that the system operates within established tolerances. If the package population contains certain standard parcel sizes, they can be used to determine the distribution of package measurements within each parcel category. By identifying any bias in measurements, a measurement of how accurate the system is at measuring all packages is provided. This is seen, for example, where a object processing company such as Federal Express sells boxes of known dimension. When an object is found within a specific tolerance within the definition of the known box sizes an assumption may be made that the object is a specific box size. By then comparing the measured characteristics to the standard characteristics a determination of accuracy can be made. By performing this accuracy determination over time, a determination of accuracy and changes in the accuracy, e.g., where measured characteristics change over time for the entire group of boxes measured, or where no boxes measured are found within a specific box category, a problem within the system may be identified.

As discussed above, the MSDS system is designed to capture both dimension and machine readable code information from every object that passes through each MSDS apparatus. Because one of dimension or machine readable code information may not be successfully determined for every object, the system must contend with situations where information capture fails.

For example, when the system is able to capture only dimension information, the system will not have available to it the machine readable code information for that object. The bar code information may be, for example, damaged, missing, misoriented, not on the correct side of the parcel or package, or errors may occur in the reading of the bar code itself such as where the symbology used was not correctly recognized. In this case the system may store the dimensions of the object along with a date/time stamp correlating the dimension capture to the position in time at which the capture occurred. The information that was captured may be used for some of the processes, such as to determine belt coverage at downstream locations based on belt speed. Further, by applying heuristics to the no-read data, an estimate of the likely effect to the operation of the sorting/processing equipment following a split in the belt or other transfer of the object to a separate object processing location/device. The historical data is used to estimate the likely future position of the object during the processing of the object.

Another problem that the MSDS may be designed to contend with is where the machine readable code is captured, however, dimension information is not properly captured. This may occur, for example, where the height of the object being dimensioned is lower than the minimum capture height for the dimensioning device. No dimension information about the object, therefore, is available. A reasonable assumption that may be made where no height information about the object is captured is that the height of the object is below the threshold of the dimensioning device. Further, the machine readable code of the object may be parsed to determine the type of packaging used and the dimensions of the package (based on the assumption that the object is a parcel or package of known dimension). If the packaging type is undetermined (e.g., customer supplied) heuristics may again be used to estimate the impact on operations of the object having unknown dimensions.

Figure 27:
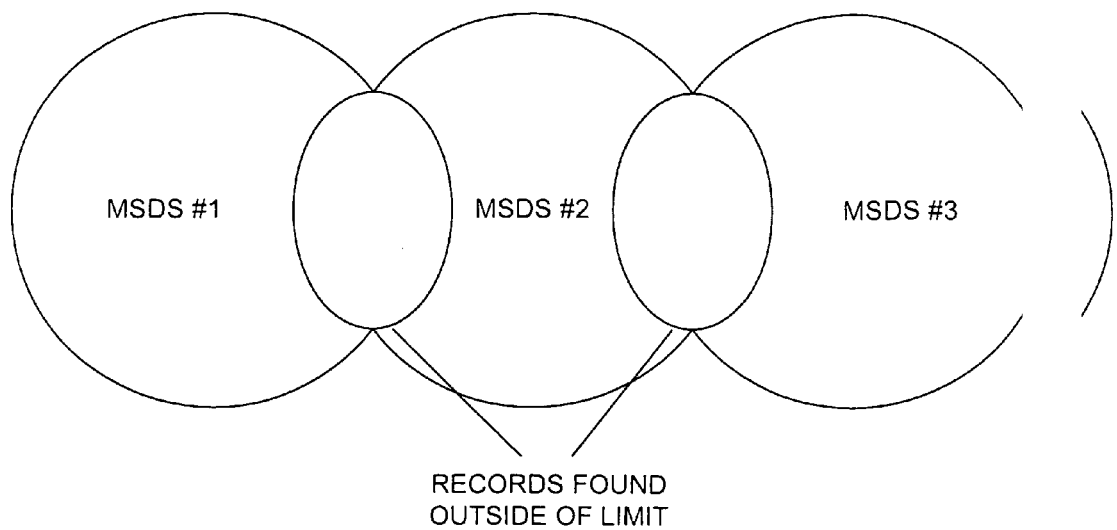
FIG. 27 illustrates the comparison of data retrieved from multiple MSDS systems.

A determination of relative MSDS accuracy can be performed by processing packages through more then one MSDS unit. If a package identifier is found to have been captured by more then one MSDS, the relative accuracy of each system can be calculated by comparing the determined values of one MSDS against another. This is done by first determining allowable differences between the two (or more) systems for each dimension, and querying for records that exceed that limit. As shown in FIG. 27, data can be combined from multiple MSDS units. In this example three MSDS units are provided and data was found to be outside of set limits for records found in both MSDS #1 and #2. In the example, records were also found to be outside of set limits for MSDS #2 and #3. Under these circumstances, it is likely that MSDS #2 has an accuracy problem.

Figure 28:
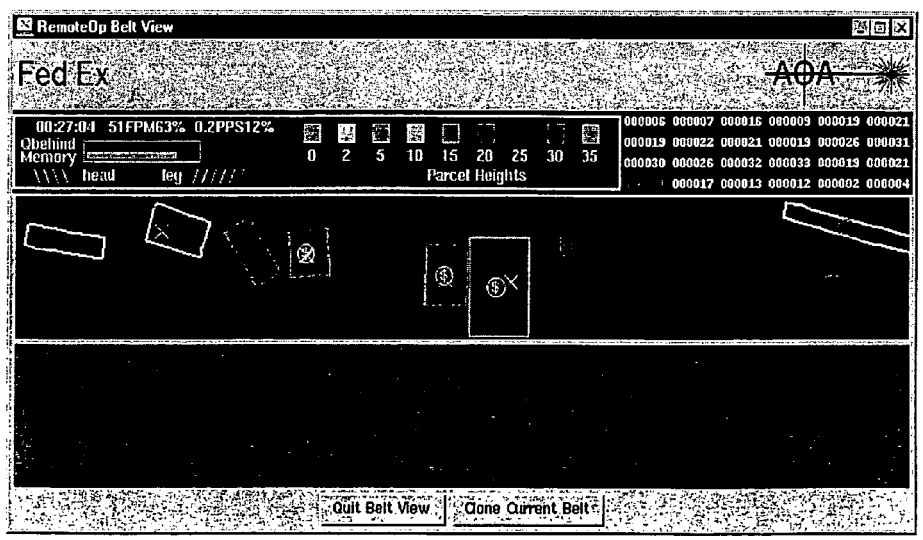
FIG. 28 is an exemplary interface for a package handling data system.

An exemplary user interface called "RemoteOp" for use in displaying the data collected by an MSDS 280 is shown in FIG. 28. The collected data is rendered in 2D from the perspective of looking down on the scanned packages, i.e., from the perspective of laser radar scanners 200. RemoteOp renders the package outlines, locations of bar codes, goodness of dimensions, bar code scanner capture leg, belt speed, and additional system parameters. The application resides locally to each MSDS client and is accessible over the network by both local and remote users. Since the application renders in 2D, the height of the individual package can be defined by assigning colors to each outline. Dimensional ("dim") confidence is indicated by how many pixels are used to draw package outlines. One pixel may be used to indicate low dim confidence, while three may indicate high confidence. If a package outline has a high dim confidence, but no bar code read, it is indicated by a "P" enclosed in a circle. If a package outline has a high dim confidence, and a valid bar code read, it is indicated by a "$" enclosed in a circle.

Using the dimensional information captured by laser bar code scanners 200 in conjunction with package identification information captured by bar code scanners 210, a customer can be billed for the dimensional weight equivalent of an object. Dimensional weight equivalent charges a customer for the volume displaced by the object rather than by its physical weight. The value of the weight equivalent is calculated by dividing volume by a density factor. The resulting number is referred to as "Dim Weight". Only the dimensions and the density factor are required to calculate the dim weight, while a package identifier is required in addition to bill a client based on dim weight.

Further uses of the information captured by the system include the use of a 3D profile of each object processed combined with record-specific destination information control package diverting systems, package re-labeling systems, and other package flow control systems that benefit from knowing parameters such as piece count, belt coverage and volume of approaching belt load.

It will be apparent to those skilled in the art that various modifications and variations can be made in the art of package handling of the present invention and in construction of this package handling system without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for capturing information about objects moving in a non-singulated flow comprising:
    an object dimensioning system for distinguishing the non-singulated objects using a height contour of the non-singulated objects and producing object dimension information for each distinguished object, wherein the object dimension information includes a plurality of dimensions for characterizing an object shape, and further producing dimensioning confidence information relating to a quality of the determined dimension information;
    an object identification system for producing object identification information for each object; and
    a processor for providing functions including correlating the object dimension information for each object to the object identification information for each object.

2. The apparatus of claim 1, wherein non-singulated objects are objects in contact with each other.

3. The apparatus of claim 1, wherein the processor includes a program for correlating object dimension information and object identification information.

4. The apparatus of claim 1, wherein the objects are parcels.

5. The apparatus of claim 1, wherein the object dimension information and object identification information have time stamp information associated therewith.

6. The apparatus of claim 1, wherein the processor correlates the object dimension information and the object identification information based on the position of the machine readable code associated with the object identification information.

7. The apparatus of claim 1, wherein the object identification system comprises at least one bar code scanner.

8. The apparatus of claim 7, wherein object dimension information associated with an object is correlated to object identification information associated with the same object using information about a scan pattern produced by the laser radar scanner.

9. The apparatus of claim 1, wherein the object dimensioning system comprises at least one dimensioning device.

10. The apparatus of claim 9, wherein the at least one dimensioning device is a vertical height scanner operating by using a beam reflected from a top surface of each object.

11. The apparatus of claim 10, wherein the beam is one of a laser, microwave, sound wave, and radio wave.

12. The apparatus of claim 10, wherein the beam is radiant energy.

13. The apparatus of claim 9, wherein the at least one vertical height scanner includes a laser generator for generating a laser beam, a curved mirror for reflecting the laser beam generated by the laser generator and for projecting the laser beam in a curved pattern onto a surface of each object, and a reflection sensor for sensing the reflection of the laser beam from the surface of the object and for producing a reflection information signal.

14. The apparatus of claim 13, wherein the processing functions of the processor includes receiving the reflection information signal from the reflection sensor and for removing a curvature from the reflection information signal to produce linearized information.

15. The apparatus of claim 13, wherein the reflection information signal is translatable into intensity and position information.

16. The apparatus of claim 1, wherein the object identification system comprises at least one bar code scanner and wherein information from the object dimension system is used to set a focus of at least one bar code scanner.

17. The apparatus of claim 1, wherein the object identification system includes at least one bar code scanner or bar code scanner element, and wherein the processor is programmed to calculate a focus for at least one bar code scanner or at least one bar code scanner element based on object height information received from the object dimension system.

18. The apparatus of claim 1, wherein the processor includes a program for determining an object classification for each object based on the object dimension information received from the object dimension system.

19. The apparatus of claim 1, wherein the processor includes a program for producing a sorting signal for each object in order to control sorting of the object based on the object identification information for the object.

20. The apparatus of claim 19, wherein the object identification information identifies a destination of an object.

21. The apparatus of claim 1, wherein the processor includes a program for producing a sorting signal for each object in order to control sorting of the object based on object dimension information for the object.

22. The apparatus of claim 1, wherein the processor includes a program for producing a sorting signal for each object in order to control sorting of the object based on object dimension information and object identification information for the object.

23. Apparatus for capturing information about objects moving in a non-singulated flow comprising:
- means for distinguishing the non-singulated objects and producing object dimension information for each distinguished object, wherein the object dimension information includes a plurality of dimensions for characterizing an object shape;
- means for determining a dimensioning confidence, wherein the dimensioning confidence relates to a quality of the determined dimension information;
- means for producing object identification information for each object; and
- means for correlating the object dimension information for each object to the object identification for each object.

24. An apparatus for capturing information about objects moving in a non-singulated flow comprising:
- means for obtaining height contours of the non-singulated objects;
- identification means for producing object identification information for each object; and
- processing means for:
  - distinguishing the non-singulated objects using the height contours,
  - determining dimension information for each distinguished object, the dimension information including a plurality of dimensions that characterize an object shape,
  - determining a dimensioning confidence, wherein the dimensioning confidence relates to a quality of the determined dimension information, and
  - correlating the dimension information for each object to the object identification for each object.

25. The apparatus of claim 24, wherein the processing means determines an object outline for each object based on the object height contours, and wherein the processing means determines the dimension information using the object outlines.

26. An apparatus for capturing information about objects moving in a non-singulated flow comprising:
- means for obtaining height contours of the non-singulated objects;
- identification means for producing object identification information for each object;
- means for determining a dimensioning confidence, wherein the dimensioning confidence relates to a quality of the determined dimension information; and
- processing means for:
  - distinguishing the non-singulated objects using the height contours,
  - determining dimension information for each distinguished object, the dimension information including a plurality of dimensions that characterize an object shape,
  - correlating the dimension information for each object to the object identification for each object.

27. The apparatus of claim 26, wherein the dimensioning confidence includes information reflecting a correspondence of each object to a predetermined object definition.

* * * * *